(12) United States Patent
Culbert et al.

(10) Patent No.: US 8,448,000 B2
(45) Date of Patent: May 21, 2013

(54) METHODS AND APPARATUSES FOR OPERATING A DATA PROCESSING SYSTEM

(75) Inventors: Michael Culbert, Monte Sereno, CA (US); Keith Alan Cox, Campbell, CA (US); Brian Howard, Portola Valley, CA (US); Josh de Cesare, Campbell, CA (US); Richard Charles Williams, Saratoga, CA (US); Dave Robbins Falkenburg, San Jose, CA (US); Daisie Iris Huang, Oakland, CA (US); Dave Radcliffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/550,922

(22) Filed: Jul. 17, 2012

(65) Prior Publication Data

US 2012/0284547 A1 Nov. 8, 2012

Related U.S. Application Data

(62) Division of application No. 12/267,329, filed on Nov. 7, 2008, now Pat. No. 8,237,386, which is a division of application No. 10/917,719, filed on Aug. 12, 2004, now Pat. No. 7,451,332.

(60) Provisional application No. 60/495,447, filed on Aug. 15, 2003.

(51) Int. Cl.
*G06F 1/26* (2006.01)

(52) U.S. Cl.
USPC ........... 713/320; 713/300; 713/324; 700/153; 700/278; 700/297; 700/299; 318/471

(58) Field of Classification Search
USPC .................. 318/471, 472, 473; 713/300, 320, 713/324; 714/47–48; 702/132; 700/153, 278, 700/297, 299
See application file for complete search history.

(56) References Cited

U.S. PATENT DOCUMENTS 5,721,837 A 2/1998 Kikinis et al.
5,812,860 A 9/1998 Horden et al.
(Continued)

FOREIGN PATENT DOCUMENTS

DE 199 30 166 A1 1/2001
WO WO 01/35200 A1 5/2001
(Continued)

OTHER PUBLICATIONS

PCT Invitation to Pay Additional Fees for PCT International Appln No. US2004/026444, mailed Feb. 25, 2005 (9 pages).
(Continued)

*Primary Examiner* — Antony M Paul
(74) *Attorney, Agent, or Firm* — Blakely, Sokoloff, Taylor & Zafman LLP

(57) ABSTRACT

Methods and apparatuses to manage working states of a data processing system. At least one embodiment of the present invention includes a data processing system with one or more sensors (e.g., physical sensors such as tachometer and thermistors, and logical sensors such as CPU load) for fine grain control of one or more components (e.g., processor, fan, hard drive, optical drive) of the system for working conditions that balance various goals (e.g., user preferences, performance, power consumption, thermal constraints, acoustic noise). In one example, the clock frequency and core voltage for a processor are actively managed to balance performance and power consumption (heat generation) without a significant latency. In one example, the speed of a cooling fan is actively managed to balance cooling effort and noise (and/or power consumption).

53 Claims, 18 Drawing Sheets

U.S. PATENT DOCUMENTS

| | | | |
|---|---|---|---|
| 5,963,887 A | 10/1999 | Giorgio | |
| 6,000,622 A * | 12/1999 | Tonner et al. | 236/11 |
| 6,006,168 A * | 12/1999 | Schumann et al. | 702/132 |
| 6,037,732 A | 3/2000 | Alfano et al. | |
| 6,112,164 A | 8/2000 | Hobson | |
| 6,122,758 A * | 9/2000 | Johnson et al. | 714/47.2 |
| 6,134,167 A * | 10/2000 | Atkinson | 365/222 |
| 6,134,667 A * | 10/2000 | Suzuki et al. | 713/300 |
| 6,470,289 B1 | 10/2002 | Peters et al. | |
| 6,545,438 B1 | 4/2003 | Mays, II | |
| 6,573,671 B2 | 6/2003 | Montero et al. | |
| 6,650,074 B1 | 11/2003 | Vyssotski et al. | |
| 6,700,339 B2 | 3/2004 | Vyssotski et al. | |
| 6,871,291 B2 * | 3/2005 | Chan et al. | 713/340 |
| 6,888,332 B2 | 5/2005 | Matsushita | |
| 6,920,874 B1 | 7/2005 | Siegel | |
| 7,036,027 B2 | 4/2006 | Kim et al. | |
| 7,111,178 B2 | 9/2006 | Rusu et al. | |
| 7,243,243 B2 | 7/2007 | Gedeon | |
| 7,275,380 B2 | 10/2007 | Durant et al. | |
| 7,310,737 B2 * | 12/2007 | Patel et al. | 713/300 |
| 7,401,644 B2 | 7/2008 | Ziarnik et al. | |
| 2002/0007463 A1 | 1/2002 | Fung | |
| 2002/0112491 A1 | 8/2002 | Malone et al. | |
| 2004/0148528 A1 | 7/2004 | Silvester | |
| 2005/0174737 A1 | 8/2005 | Meier | |
| 2006/0016901 A1 | 1/2006 | Beitelmal et al. | |
| 2007/0067136 A1 | 3/2007 | Conroy et al. | |

FOREIGN PATENT DOCUMENTS

| | | |
|---|---|---|
| WO | WO 03/060676 A2 | 7/2003 |
| WO | WO 03/073187 A2 | 9/2003 |

OTHER PUBLICATIONS

PCT International Search Report and Written Opinion for PCT International Appln No. US2004/026444, mailed Aug. 19, 2005 (24 pages).

* cited by examiner

METHODS AND APPARATUSES FOR OPERATING A DATA PROCESSING SYSTEM

This application is a divisional of U.S. patent application Ser. No. 12/267,329 filed on Nov. 7, 2008 now U.S. Pat. No. 8,237,386, which is a divisional of U.S. patent application Ser. No. 10/917,719 filed on Aug. 12, 2004, now issued as U.S. Pat. No. 7,451,332, and is also related to and claims the benefit of the filing date of U.S. Provisional Application No. 60/495,447, filed Aug. 15, 2003, and entitled "Methods and Apparatuses for Operating a Data Processing System" by the inventors Michael Culbert, Keith Cox, Brian Howard, Josh De Cesare, Rich Williams, Dave Falkenburg, Daisie Huang, and Dave Radcliffe.

FIELD OF THE TECHNOLOGY

The field of technology relates generally to data processing systems, and more particularly but not exclusively to the management of power usage and temperature in the data processing systems.

BACKGROUND

A data processing system (e.g., a desktop computer or a laptop computer) typically contains a number of components that consume power from a power supply (e.g., battery or AC adapter) to perform different tasks. For example, a microprocessor consumes power to perform computation, generating heat in the process; and, a cooling fan consumes power to dissipate heat.

Typically, a data processing system is designed for operating in a given environment to deliver high computation performance. One or more fans and heat sinks are typically used to cool the system so that the data processing system is not overheated in a condition of normal use.

To be energy efficient, some computers have power management systems which may temporarily put a hard drive or a display screen in a low power mode after idling for a period of time. When a component is in a low power mode, the component is not functioning at least in part (e.g., the display screen is not displaying images, a hard drive cannot be accessed for read or write operations, and a section of a chip is not energized with power to perform computation). In some systems, a cooling fan is triggered by a temperature sensor such that the cooling fan is turned on when the sensor detects that the temperature is above a threshold.

To protect from overheating, some microprocessors have built-in hardware to slow a processor when the processor is too hot. However, built-in hardware in a processor that slows down the processor when the processor is too hot is restricted to only changing processor performance to regulate the temperature. Intrinsically, it is not able to regulate other devices in the system or optimize thermal management of the entire system. Similarly, some computers (e.g., iBook laptops from Apple Inc.) automatically enter into a shut down when it is too hot (e.g., because a fan failed). Automatic shutdown of a notebook computer is an emergency solution for unusual situations, such as when the cooling fan is failing. It does not regulate the temperature during the normal use of the computer.

Thus, a computing platform (including a processor) is commonly designed for increased performance, which typically requires increased power consumption. However, computing platforms, especially in mobile applications, are also designed to reduce power consumption such that a limited power resource (e.g., a battery) can support the computing platform for an increased period of usage time. These design goals are typically in conflict.

One conventional solution to the conflicting design goals is to provide a means for a user to switch the configuration of the computing platform between a high performance mode and a power conservation mode, as desired. For example, a computing platform may allow a user to select the desired mode via a hardware switch or via a menu and dialog box displayed by the computing platform. For example, some computers allow a user to manually select a clock frequency for the microprocessor.

SUMMARY OF THE DESCRIPTION

Methods and apparatuses to manage working states of a data processing system are described here. Some of the embodiments of the present invention are summarized in this section.

At least one embodiment of the present invention includes a data processing system with one or more sensors (e.g., physical sensors such as tachometer and thermistors, and logical sensors such as CPU load) for fine grain control of one or more components (e.g., processor, fan, hard drive, optical drive) of the system for working conditions that balance various goals (e.g., user preferences, performance, power consumption, thermal constraints, acoustic noise). In one example, the clock frequency and the core voltage for a processor are actively managed to balance performance and power consumption (heat generation) without a significant latency. In one example, the speed of a cooling fan is actively managed to balance cooling effort and noise (and/or power consumption).

Thermal managers according to embodiments of the present invention monitor the system temperature based on a number of sensors and conditions (e.g., sensed temperatures, lid position, battery charging status, current computation tasks and user preferences) to provide the best of mixture of cooling (e.g., by controlling one or more cooling fans) and reduced heat generation (e.g., by adjusting the working states of the heat generating devices, such as CPU, GPU, hard drives, optical drives, memory chips, core logic chips and others) to provide the best performance for the current task.

In one aspect of the present invention, a method to operate a data processing system includes: determining a control level for a first component of the data processing system based on information obtained from a plurality of sensors (e.g., a temperature sensor determining a temperature in the data processing system, such as a particular component's local temperature which is one of many components in the system); and, automatically adjusting the control of the first component according to the control level to move the first component from a first working state to a second working state. In one example, the first component includes a cooling fan of the data processing system; and, the cooling fan runs at a first speed in the first working state and a second speed in the second working state; and, in one example, a duty cycle of the cooling fan is adjusted to run the cooling fan from the first speed to the second speed. In one example, the first component includes a processor; the first working state includes a first clock frequency and a first core voltage for the processor; and, the second working state includes a second clock frequency (which may be lower or higher than the first clock frequency) and a second core voltage (which may be lower or higher than the first core voltage) for the processor. In one example, the first component includes a Graphics Processing Unit (GPU); the first working state includes a first swap interval; and, the second working state includes a second swap interval. In one example, the control of a second component is further adjusted automatically based on the information obtained from the plurality of sensors to move the second component from a third working state to a fourth working state. In one example, the first component is a heat source of the data processing system and the second component is a cooling source of the data processing system. In one example, the control level is determined further based on one or more user preferences. In one example, one of the sensors includes a software module (e.g., an operating system's kernel) determining a processor load of the data processing system.

In one aspect of the present invention, a method to operate a data processing system includes: determining a subset of control settings from a plurality of control settings of a plurality of components of the data processing system based on information obtained from a plurality of sensors (e.g., a temperature sensor, a tachometer, a software module determining a load of a processor), each of which determines an aspect of a working condition of the data processing system; and adjusting the subset of control settings to change working states of corresponding components of the data processing system to balance requirements in performance and in at least one of: thermal constraint and power consumption. In one example, the plurality of components include heat sources (e.g., a Central Processing Unit (CPU), a Graphics Processing Unit (GPU), a hard drive, an optical drive, an Integrated Circuit (IC) bridge chip) of the data processing system and cooling sources of the data processing system. In one example, an amount of cooling change is determined based on the information obtained from the plurality of sensors; and, the subset of control settings are adjusted to effect the amount of cooling change. In one example, the amount of cooling change is determined according to a fuzzy logic; and, determining the subset of control settings includes determining a prioritized list of the plurality of control settings. In one example, the prioritized list is determined at least partially based on one or more user preferences. In one example, the amount of cooling change is parceled out to the subset of control settings. In one example, a first state of the data processing system is determined from the information obtained from the plurality of sensors; and, the subset of control settings is determined from a decision to move the data processing system from the first state to a second state.

In one aspect of the present invention, a method to operate a cooling fan of a data processing system includes: adjusting the cooling fan from running at a first speed to running at a second speed in response to a temperature sensor measurement and a user preference. In one example, it is further verified that the cooling fan is running at the second speed (e.g., using tachometer information obtained from a fan controller for the cooling fan). In one example, a duty cycle of the cooling fan is adjusted to run the cooling fan from the first speed to the second speed. In one example, one or more temperature measurements are determined; and the second speed for the cooling fan is determined based at least partially on the one or more temperature measurements. In one example, the one or more temperature measurements are obtained from one or more temperature sensors instrumented in the data processing system; and, the one or more temperature measurements indicate temperatures of at least one of: a) a microprocessor of the data processing system; b) a graphics chip of the data processing system; and c) a memory chip of the data processing system. In one example, the microprocessor of the data processing system determines the second speed. In one example, the second speed is determined further based on at least one of: a user preference stored in a machine readable medium of the data processing system; and, a computation load level on the data processing system (e.g., the load level is low because the processor is idling and the temperature level is low and a user preference has been set by a user such that in this state the fan's speed is reduced to reduce noise and power consumption).

In one aspect of the present invention, a method to operate a processor of a data processing system includes: shifting a power supply of the processor from a first voltage to a second voltage without resetting the processor. In one example, a frequency of a clock of the data processing system is slewed (changed slowly) to transit a clock of the processor from a first frequency to a second frequency (e.g., by instructing a clock chip to use a new frequency multiplier). In one example, the processor continues to execute instructions while the frequency of the clock is slewed and while the power supply is shifted from the first voltage to the second voltage. In one example, the power supply is maintained at one of the first and second voltages while the frequency of the clock is slewed; and, the clock of the processor is maintained at one of the first and second frequencies while the power supply is shifted from the first voltage to the second voltage. In one example, the first frequency is higher than the second frequency; the first voltage is higher than the second voltage; and, the power supply is shifted from the first voltage to the second voltage after the clock of the processor transits from the first frequency to the second frequency. In another example, the first frequency is lower than the second frequency; the first voltage is lower than the second voltage; and, the power supply is shifted from the first voltage to the second voltage before the clock of the processor transits from the first frequency to the second frequency. In one example, a frequency multiplier of the processor is adjusted to switch a clock of the processor from a first frequency to a second frequency. In one example, the processor is not reset during switching from the first frequency to the second frequency.

The present invention includes apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
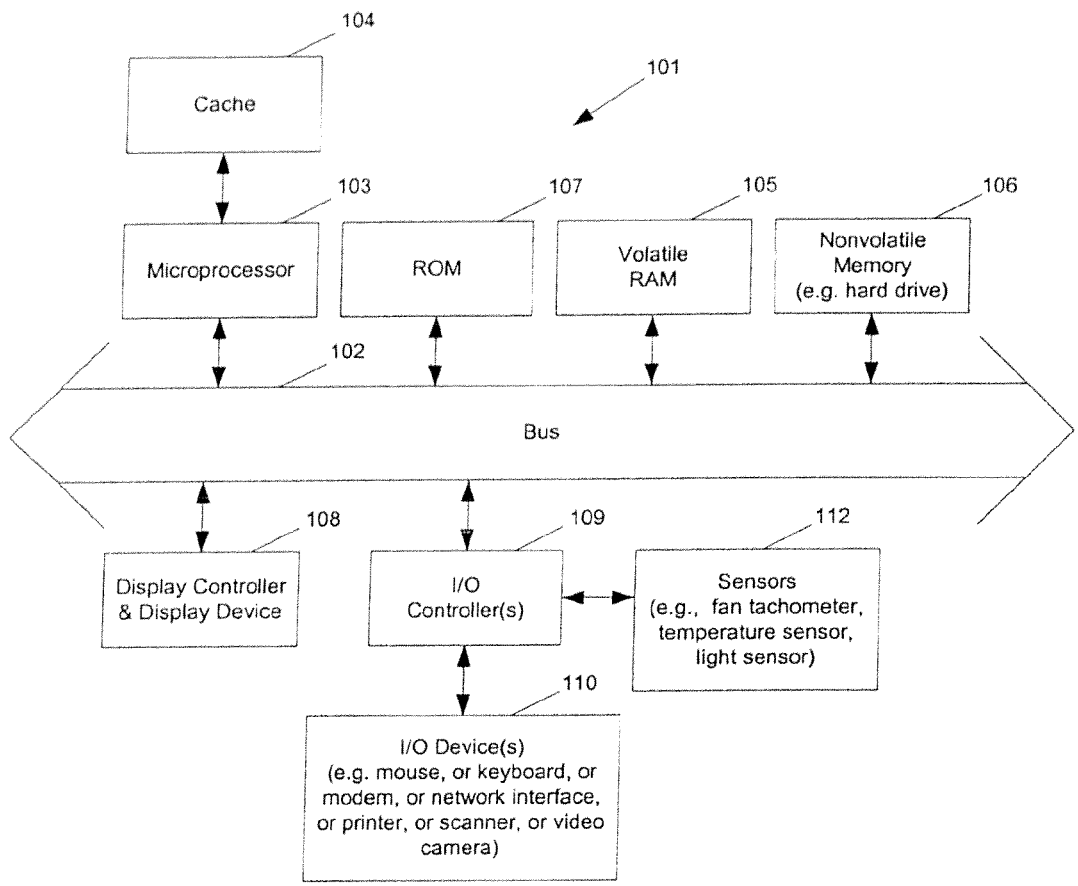
FIG. 1 shows a block diagram example of a data processing system which may be used with the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

As the performance of data processing systems continues to increase, so do power and cooling requirements. A fan and heat sink may not be adequate for such high performance data processing systems. To meet the challenge of combined conflicting design goals (e.g., computation performance, power usage, cooling, acoustic noise, and others), at least one embodiment of the present invention seeks to manage the working states of various components of a data processing system according to sensed information (e.g., one or more temperature sensors and performance sensors and fan speed sensors). Since hardware-based solutions have pre-determined flexibility, at least one embodiment of the present invention utilizes the processing power of the data processing system to provide software-based management solutions (e.g., software in a kernel of an operating system).

In the present document, a working state of a component (e.g., a microprocessor or a fan) is a state in which the component works to provides the functionality of the component at a specific level of cost (e.g., the consumption of power usage, the generation of noise or heat, or other factors). A working state does not normally include the state in which the component does not work to provide its functionality for the system.

One embodiment of the present invention involves power and thermal management strategies to meet the combined challenge of high performance, low power consumption, low noise and tight thermal constraints. In one embodiment, power and temperature in a computer are actively managed so that the computer can go faster, run quieter with extended battery life, and avoid running too hot, as the computation speeds increase and the enclosures of computers continue to push the limits of engineering.

In one embodiment of the present invention, a computer system is instrumented with one or more sensors; and, at least one component of the system has a number of different working states. For example, different working states have different power consumption levels and performance levels (e.g., processor speeds measured in megahertz or processing operations per second, etc.), which are actively managed to meet conflicting goals, such as high performance and low power consumption, subject to thermal constraints (e.g., the interior of the computer enclosure should not or cannot exceed a certain temperature which may damage certain components in the enclosure). Managing thermal output and finessing cooling efforts can help some machines avoid the need for fans, while allowing other machines to run fans more quietly. With the help of the information collected from the sensors, the computation performance, user preferences and environmental requirements can be balanced to reach a best mix for a particular usage of the system.

In one embodiment of the present invention, sensors are instrumented (e.g., in the hot spots for measuring temperature); controls are constructed to gracefully adjust the working states (e.g., through the adjustment of frequencies and voltages) for tradeoff in performance, power consumption, heat generation and heat removal; and, a thermal manager is provided to monitor and control one or more thermal zones, according to the constraints of system and user preferences, which define the priorities of conflicting goals.

In one embodiment of the present invention, temperature sensors are instrumented so that the temperatures of hot spots can be periodically polled. The temperature sensors can be implemented as thermal diodes on Integrated Circuit (IC) chips (e.g., microprocessors, graphics chips, microcontrollers, and others). Further, tachometers are instrumented to obtain the feedback about the working states of fans.

In one embodiment of the present invention, fine-grained control of frequencies and voltages for a data processing system is added in an architecture-independent way to manage power consumption and heat generation. For example, Central Processing Unit (CPU) voltage and frequency control are provided to allow multiple CPU frequency and voltage states with fine-grained control beyond just high or low; and cooling fans have speed control beyond just on or off.

In one embodiment of the present invention, software device drivers dynamically tweak power and performance. For example, a CPU software driver manages CPU working states (e.g., speed, frequency, voltage) based on computation load, sensor measurements (e.g., CPU temperatures and CPU load levels), and various preferences and priorities (e.g., user preferences with respect to fan noise or other noise or battery life). Device drivers for other controls use a similar approach to select the working state based on the required work load and various constraints.

In one embodiment of the present invention, a thermal manager software module controls the power consumption level of various components through the software device drivers. For example, the software thermal manager may monitor and control physical (e.g. temperature) and logical (e.g. CPU load) sensors, optimize for user-center or design-center priorities, such as performance, heat, battery life, and noise, force drivers into lower power states to minimize power consumption and/or heat production, and remove heat with minimal noise. Further, the thermal manager may monitor and control multiple independent zones.

It is vastly cheaper to reject a faulty part during a factory burn in process (before a customer receives the part) than to handle a customer return. After a design is instrumented, bad parts can be detected early during the manufacture of or testing of the system, using diagnostics tools. For example, when a computer is instrumented with temperature sensors, misapplied heatsinks may be detected for correction, removing one of the most costly manufacturing defects.

Many of the methods of the present invention may be performed with a digital processing system, such as a conventional, general-purpose computer system. Special purpose computers, which are designed or programmed to perform only one function, may also be used.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Macintosh computer from Apple Inc.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM or a G5 microprocessor from IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

Sensors 112 are coupled to controller 109 to provide information about the operating environment condition of the components of the data processing system. For example, sensors 112 may include temperature sensors for determining the temperatures at a plurality of locations in the data processing system, such as the temperatures of microprocessor 103, volatile RAM 104, a hard drive and an optical (e.g., CD/DVD) drive; sensors 112 may further include a fan tachometer for determining the speed of a cooling fan, a light sensor for determining the amount of required backlight; a sensor to determine whether a display of a laptop is opened or closed and others. Although FIG. 1 illustrates a configuration in which sensors 112 are coupled to controller 109, it is understood that sensors may also be integrated into components (e.g., microprocessor 103). Further, software sensors like kernel load factor are also used in at least some embodiments of the present invention.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device or a combination of memory devices. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one or more of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Figure 2:
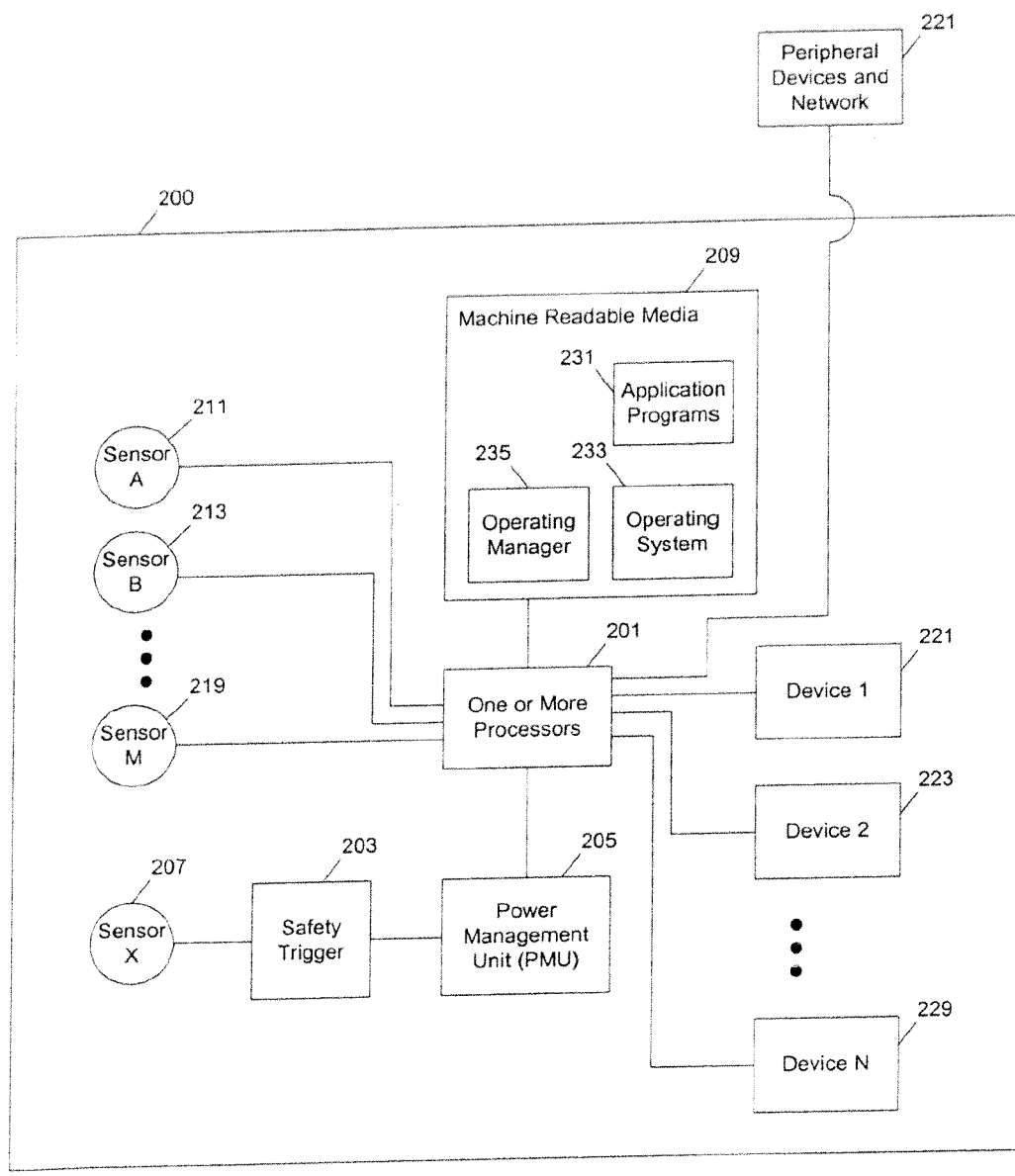
FIG. 2 shows a data processing system according to one embodiment of the present invention.

FIG. 2 shows a data processing system according to one embodiment of the present invention. In FIG. 2, the data processing system includes one or more processors 201 (e.g., a Graphics Processing Unit (GPU) and one or more Central Processing Units (CPU)), devices 221-229 (e.g., cooling fan, battery charging system, AC adapter) and machine readable media 209 (e.g., RAM chips, ROM chips, hard drive, optical drive). The data processing system may include communication links to one or more devices outside housing 200. For example, the data processing system may be connected to a network or peripheral devices (221), such as a monitor, a keyboard, a cursor controlling device (e.g., mouse, a track ball, or a touch screen, or a touch pad), a printer, a storage device, or others. Although FIG. 2 shows that machine readable media 209 are inside housing 200, it is understood that a portion of the machine readable media may be outside housing 200 (e.g., connected through an IEEE 1394 bus or a USB bus, or a network connection). Further, some of the peripheral devices listed above as examples of devices 221 may be integrated inside housing 200. For example, a touch pad, an LCD display panel and a keyboard can be integrated within housing 200 (e.g., on a notebook computer).

Machine readable media 209 have program instructions and data for operating system 233 (e.g., Mac OS X), application programs 231 (e.g., a word processing program), and operating manager 235 for managing the states of the components of the system. Note that operating manager 235 can be a part of operating system 233. Sensors 211-219 are instrumented within housing 200 of the data processing system to obtain information about the environmental conditions of various components of the data processing system, such as the temperature of the processors (201), the fan speed of a cooling fan, the lid position (e.g., open or closed). Some of the sensors can also be software modules that determine the computation loads for the processors. Operating manager 235, when executed on at least one of the processors (201), causes the processing of the information obtained from sensors 211-219 and the adjustment of the working states of the processors (201) and the devices (e.g., 221-229) to provide trade-off between performance and power usage while maintain proper thermal constraints to avoid damage or loss of data.

Because software can crash, a safety thermal cutoff remains independent of the operating system and is tied directly to Power Management Unit (PMU 205) which includes a hardware only portion which is not effected by a software crash. When a sensor (e.g., 207) detects a temperature that exceeds a safety threshold, hardware-based safety trigger 203 signals PMU for proper action. PMU 205 may force a shutdown of the data processing system to prevent damage when an extreme thermal condition is detected. PMU 205 notifies processors 201 about the safety threshold; and, a software module may then notify the user that the safety threshold is being approached, if one of processors 201 is responsive to PMU. If none of processors 201 is responding to the safety alert or if its response is inadequate to reduce the temperature, PMU 205 takes actions to power off the data processing system. Note that sensor 207 may be different and separate from sensors 211-219; alternatively, sensor 207 may be part of sensors 211-219 as shared hardware.

Figure 3:
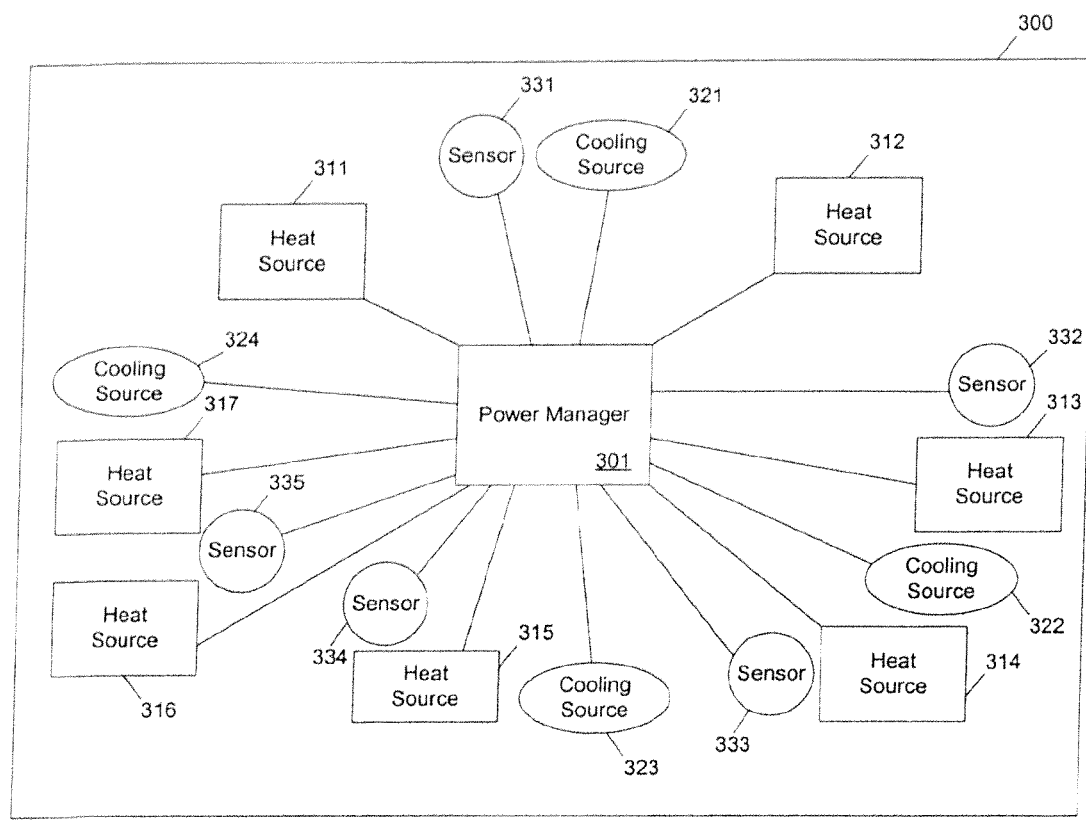
FIG. 3 is a simplified block diagram illustrating heat sources and cooling sources of an exemplary data processing system having power and temperature management according to one embodiment of the present invention.

FIG. 3 is a simplified block diagram illustrating heat sources and cooling sources of an exemplary data processing system having power and temperature management according to one embodiment of the present invention. In FIG. 3, data processing system 300 has power and temperature management according to one embodiment of the present invention. System 300 includes power manager 301 (e.g., a software program running as a portion of the operating system on data processing system 300), heat sources 311-317 (e.g., Central Processing Unit (CPU), Graphics Processing Unit (GPU), memory chips, hard drive, optical drive, backlight, battery charging system, system core logic and others) and cooling sources 321-324 (e.g., cooling fans, heat pipes and heat sinks) located within housing 300 of the data processing system.

The data processing system is instrumented with sensors 331-335 (e.g., temperature sensors, tachometers, light sensors, noise sensor and others) within housing 300.

In one embodiment of the present invention, power manager 301 is physically and/or logically coupled to heat sources 311-317, cooling sources 321-324 and sensors 331-335. For example, power manager 301 can be partially a software program running on the data processing system, using the processing power and storage capacities provided by the heat sources, and partially hardware providing control signals to the heating sources and cooling sources to balance the performance and power consumption and limit the temperatures monitored by the sensors. Some of sensors 331-335 may be disposed proximate to some of heat sources 311-317, with some of cooling sources 321-324 being disposed so as to operatively coupled to the heat sources to remove heat from the heat sources.

Figure 4:
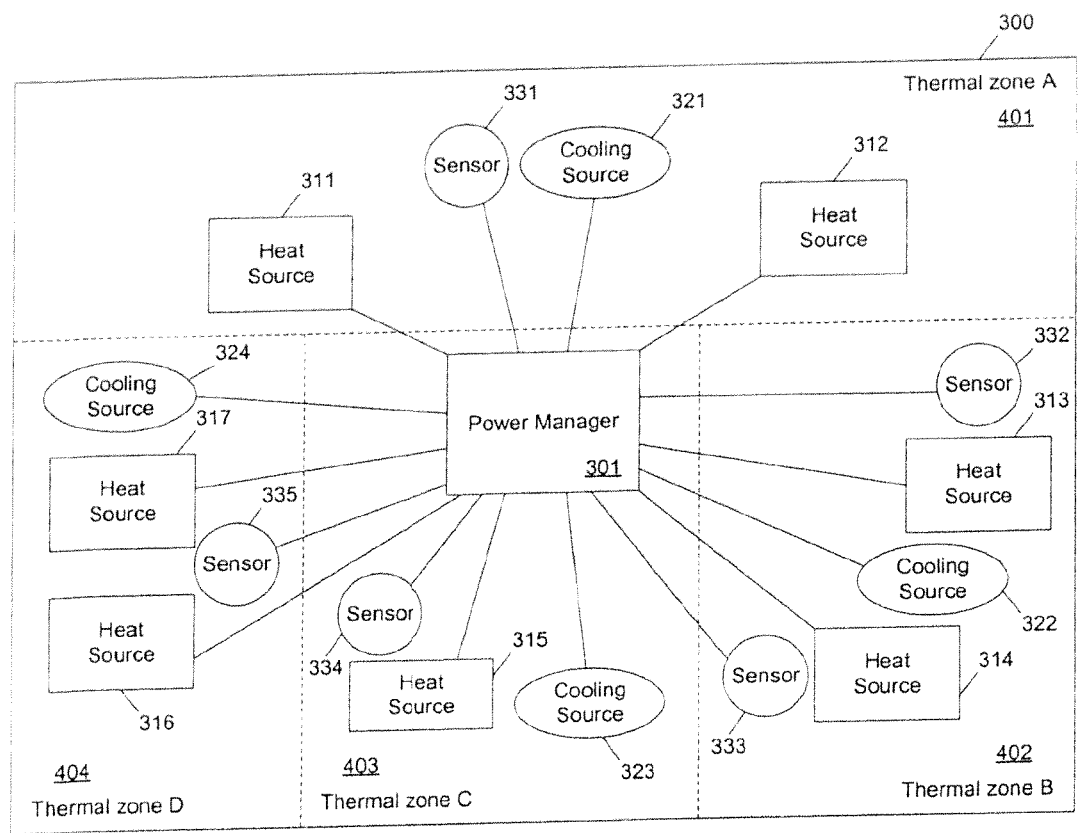
FIG. 4 is a simplified block diagram illustrating a data processing system depicted partitioned into thermal zones for power and temperature management according to one embodiment of the present invention.

FIG. 4 is a simplified block diagram illustrating a data processing system depicted partitioned into thermal zones for power and temperature management according to one embodiment of the present invention. In FIG. 4, the data processing system is thermally divided into a plurality of zones (e.g., zones 401-404). The temperature of these thermal zones can be individually controlled via controls (e.g., CPU controller, fan controller, hard drive controller) to the heat sources and cooling sources disposed within each thermal zone using the information from the sensors in the corresponding zone.

In one embodiment of the present invention, the data processing system is enclosed within multiple isolated thermal zones (MITZ). In the present application, a thermal zone is a volume of space containing components that have strong thermal interaction. For example, in a thermal zone, the heat from one device may raise significantly the temperature of another; the devices may share a common cooling system or a common temperature sensor. One or more temperatures within one zone are sensed for thermal management in that zone.

It is possible that one zone in a system requires software management, and another does not. For example, a power supply could control a fan in a first zone, with the CPU and another fan in a second zone. In this example, cooling the power supply may very well cool the rest of the zone adequately (perhaps even over-cooling some components). Since power consumption relates to heat in the power supply, it might be possible that meeting the cooling requirements of the power supply is guaranteed to cool all other devices in its thermal zone. In this case, the power supply zone would require no active management. At the same time, the CPU zone would need sensors and active thermal management.

Figure 5:
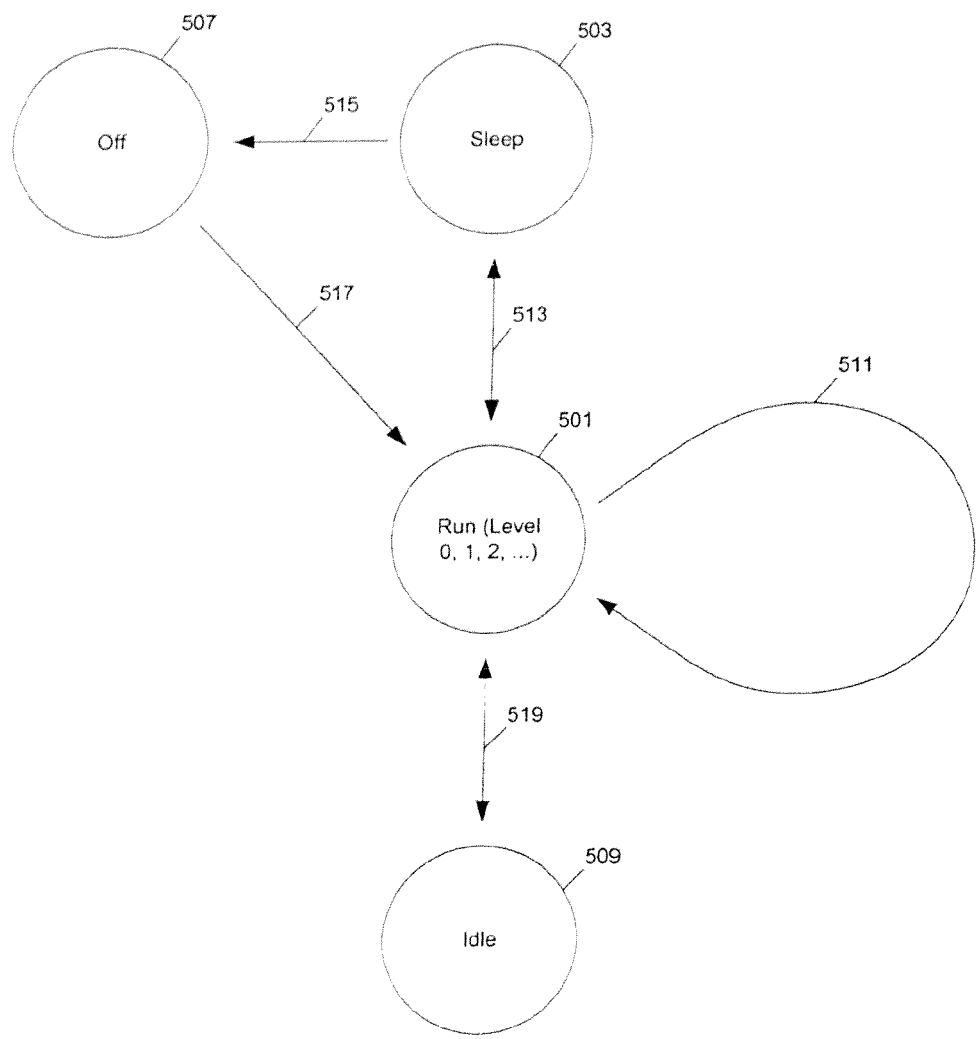
FIG. 5 illustrates operational states for system level power management according to one embodiment of the present invention.

FIG. 5 illustrates operational states for system level power management according to one embodiment of the present invention. There are four basic states in the system level power state diagram. These states are Off 507, Run 501, Idle 509 and Sleep 503. Run 501 includes a range of working states with different power and performance levels.

Off 507 represents a state when all power plane for the system is turned off, with the exception of those power planes necessary to run the power system (and one or more peripherals that can be operated in an autonomous mode).

Idle 509 represents a state when the system is idling. Cache coherency is maintained when in Idle 509. All clocks are running and the system can return to running code within a few nanoseconds. When all CPUs stop computing, the system enters (519) from Run 501 into Idle 509, such as when the last active processor of the system is stopped in the Nap state 603 and is dynamically switched between the Nap state 603 and the Doze state 607 for snoop cycles to complete. The North Bridge can control the switching between the Nap state 603 and the Doze state 607, which will be described below with FIG. 6 in detail. Any processor interrupt returns (519) the system from Idle 509 to Run 501.

Sleep 503 represents a state when the system is shutdown with various states preserved for instance recovery (513) to Run 501. In one embodiment, the states of the North Bridge, RAM and South Bridge are preserved to provide the appearance of instant-on/always-available. All processors are powered off after their caches are flushed and their states preserved in RAM for the system to enter (513) from Run 501 into Sleep 503. Other devices, such as the devices in PCI slots (or PCMCIA slots) are also powered off after preserving their state in RAM. All clocks in the system in the system are stopped except for the one for real-time clock function.

Run 501 represents a state when a least one processor of the system is running. If the system has multiple processors, the individual processors may move in and out of their respective processor power states (e.g., Doze 607, Nap 603, Sleep 605, Off 609 in FIG. 6) in a fully independent manner. While in Run 501 state, the processors can move together between different performance levels. The operating system sets the policies for when to shift performance levels and when to power manage individual CPUs. For example, if there are threads waiting to be scheduled, the system is in Run 501 state and at least one CPU is running and executing the threads. When the scheduler of the operating system runs out of threads, the system transitions from Run 501 to Idle 509.

There are multiple power and performance levels associated with Run 501, in which the system moves (511) among them as load and other constraints dictate. In one embodiment of the present invention, the processor continues executing instructions while shifting in performance levels, remaining in Run 501 but shifting between different working states with different power consumption levels and performance levels. For example, when more performance is needed, the CPU voltage and frequency may be increased to trade increased power consumption for high performance. When full performance is not needed and/or cooling down is required, the CPU voltage and frequency may be decreased to trade performance for reduction in power consumption, which helps cooling the processor(s) down.

In one embodiment of the present invention, a device is placed into a working state that uses as only much power as is required to perform a task. The power consumption for a device is scaled to match the work being requested. For example, the speed of a fan is adjusted to keep the temperature within the allowable range while using less power and producing less noise than when the fan is at the full speed. The fan is controlled to run only as fast as it needs to, and no faster. Sensors instrumented in the system are used to gather the information; and, the data processing system processes the information to decide how to control the devices.

In a given system implementation, there are different devices (e.g., CPU, hard drive, optical drive, graphics chip, power supply, memory chip, core logic) that may reach their thermal maximums (maximum thermal thresholds). If a device may be above its allowable temperature (to become overheated) under certain operating condition, the device may be included in a thermal management algorithm; and, a temperature sensor can be instrumented for detecting the current temperature of the device. If the enclosure and airflow somehow guarantees that a device will stay within its specifications (including noise), temperature sensing of that device is not required; and, that device may be included only for power management.

There also might be a case where the temperature of one device is sensed indirectly via its effect on another device. For example, a design might have the hard drives preheating the air that flows over the CPU. If the algorithm for protecting the CPU always turns on the fan before the hard drives overheat, it is not necessary to sense hard drive temperature directly.

In one embodiment of the present invention, device management includes using sensors for the devices and implementing software drivers that controls the operations of the devices according to the work being requested. In one embodiment, sensors include thermistors, hard drive temperatures, kernel loads, and more. Controls are provided to vary fan speeds, backlight brightness, hard drive speeds, to power devices off, to put a CPU in a different working state, and to throttle thread scheduling.

Many of the devices of a computer (e.g., CPUs, GPU, hard drives, optical drives, backlight, charging system, etc.) have multiple power states, which can be used for active power management, such as varying spindle speed of hard drives.

Figure 6:
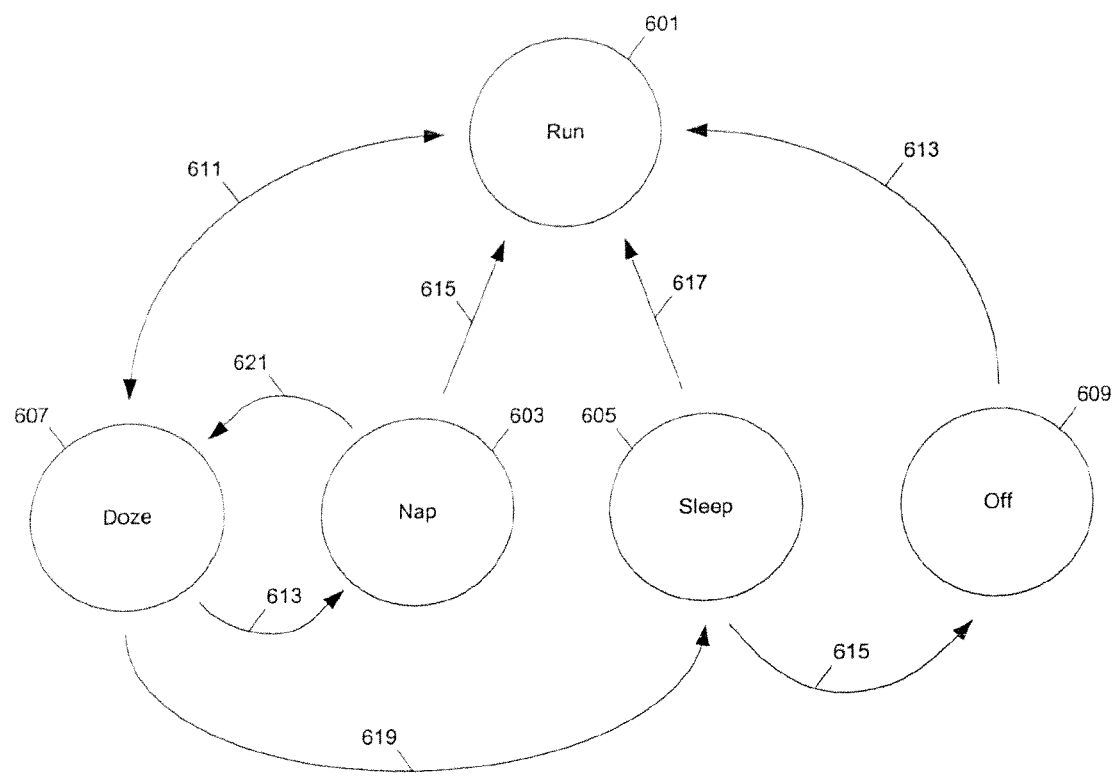
FIG. 6 illustrates operational states for processor and/or system power management according to one embodiment of the present invention.

FIG. 6 illustrates operational states for processor and/or system power management according to one embodiment of the present invention. In the Run state 601, all processor units are active. Dynamic clock stopping to individual functional units is allowed, but are invisible to software. Clocks are automatically restored to functional units immediately upon detection of any instruction to be dispatched for that functional unit.

In the Doze state 607, all execution units are stopped. All processor caches and bus interface logic necessary to maintain cache coherency are active.

In the Nap state 603, all execution units are stopped, along with all caches and bus interface logic. The system can bring (621) the processor back to the Doze state 607 by de-asserting a signal (e.g., QAck). This is done when the system needs the processor to perform cache coherency operations.

In the Sleep state 605, all execution units are stopped, while the processor state is maintained. Before entering (619) the Sleep state 605, all processor caches are flushed, as a sleeping processor does not perform any cache coherence operation. In systems with multi-drop bus topologies (60x, MaxBus), sleeping processors do not respond to deassertion (e.g., QAck). Systems with point-to-point interconnect topologies (e.g., ApplePI) uses per-processor deassertion signals, but not to a sleeping processor.

In the Off state 609, core power is removed from the processor. The Off state 609 is typically used in multiprocessor systems. In one embodiment, before a processor enters the Power Off state, it sets its PowerDownEnabled bit inside the core logic. Once the core logic asserts deassertion signal (e.g., QAck) to put a processor into the Sleep state 605, the core logic checks the PowerDownEnabled bit. If the bit is set, the processor interface is then put into an appropriate condition for powering down the processor. An interrupt is generated to signal the system that the processor is ready to have its power removed. A live processor receives the interrupt and performs the appropriate actions to remove power from the sleeping CPU, moving (615) it into the Off state 609.

When software determines that it again needs the processor that is in the Off state 609, it performs the appropriate actions to reapply power to the CPU and reset it, returning (613) it to the Run state 601.

In a single processor system, the CPU may avoid the Sleep state 605 and target the Nap state 607 to avoid the penalty associated with cache flushing. In a multi-processor system, every processor except the last active processor uses either the Doze state 607 or the Sleep state 605. These two states impose no penalty for performing snoop operations. The last active processor will use Nap 607 in a manner similar to the single processor. The system enters the Idle state 509 when the last active (or the only) processor enters the Nap state 603.

One embodiment of the present invention moves the processor from performance level to performance level by changing frequency and power voltage while staying within the Run state 601. Each performance level is a different combination of CPU core frequency, CPU bus frequency, and CPU core voltage that defines both a computing performance level and a power consumption level. Each performance level representing a working state of the CPU.

The number of performance levels implemented in a system depends upon a variety of factors. For example, some CPUs may only support two operating points, limiting the system implementation to Run 0 and Run 1. A well-managed portable design may implement Run 0 for minimum power, Run 1 for specific functionality level such as DVD playback, and Run 2 for the clock frequency for the portable system. A high performance desktop may implement Run 0 for power and thermal savings, Run 1 at 90% of maximum clock frequency for most operations, and Run 2 at maximum power. One example of different performance levels is illustrated below.

Run 0: This is the lowest power and performance level supported by the system. The processor's Doze mode entered from Run 0 may be different than that used at the other performance levels. In particular, a large portion of the CPU may be powered at a lower voltage than that required by the snoop logic, saving significant leakage power. Run 0 can be the state at which the system starts executing code after a Power-On or Restart event.

Run 1 . . . n: These states have incremental power and performance levels above the next lower level one. These states differ solely by CPU core voltage and frequency, which sets leakage power, operating power and CPU performance.

Run n+1: This state is special in requiring no transitions out of this state. Some systems may achieve higher performance if the CPU does not leave the Run state 601. Since the surge currents for transition in and out of Run can be significant, transitions can cause the maximum droop on the power supply rail. By avoiding these droops at the highest performance point, the maximum performance can be achieved. However, by not allowing the CPU to Nap (603) or Sleep (605), significant additional power will be used.

In one embodiment, with the processor environment set to a specific performance level, the processors can independently transition back and forth between their different power saving states (Run 601, Doze 607, Nap 603, Sleep 605, and Off 609). The system enters automatically from Run 501 into Idle 509 whenever there are no processors in the Run state 601.

Some operating systems (e.g., Mac OS X) have the capabilities for monitoring the activity level of the CPU(s). In one embodiment, after determining the processing load currently required by the CPU, the CPU can determine if it is above a certain activity level. Based on the processing load level, the management system can initiate a shift upward or downward in performance.

Likewise, if the CPU determines that it doesn't need all the performance that is currently available, it can shift downward in performance in order to save significant power. Since the CPU continues to operate throughout the process of shifting, no significant latency is incurred as a result of the performance level change.

In one embodiment, the algorithms used to determine when to shift up and down in performance are contained in system software. The software makes the decisions about when to change the performance level. In one embodiment of the present invention, the software relies not only on CPU load, but also on system thermal conditions, user preferences and others, to decide whether to move to a higher or lower performance level.

In one embodiment of the present invention, the CPU continues executing instructions throughout the performance transition process without CPU reset.

Figure 7:
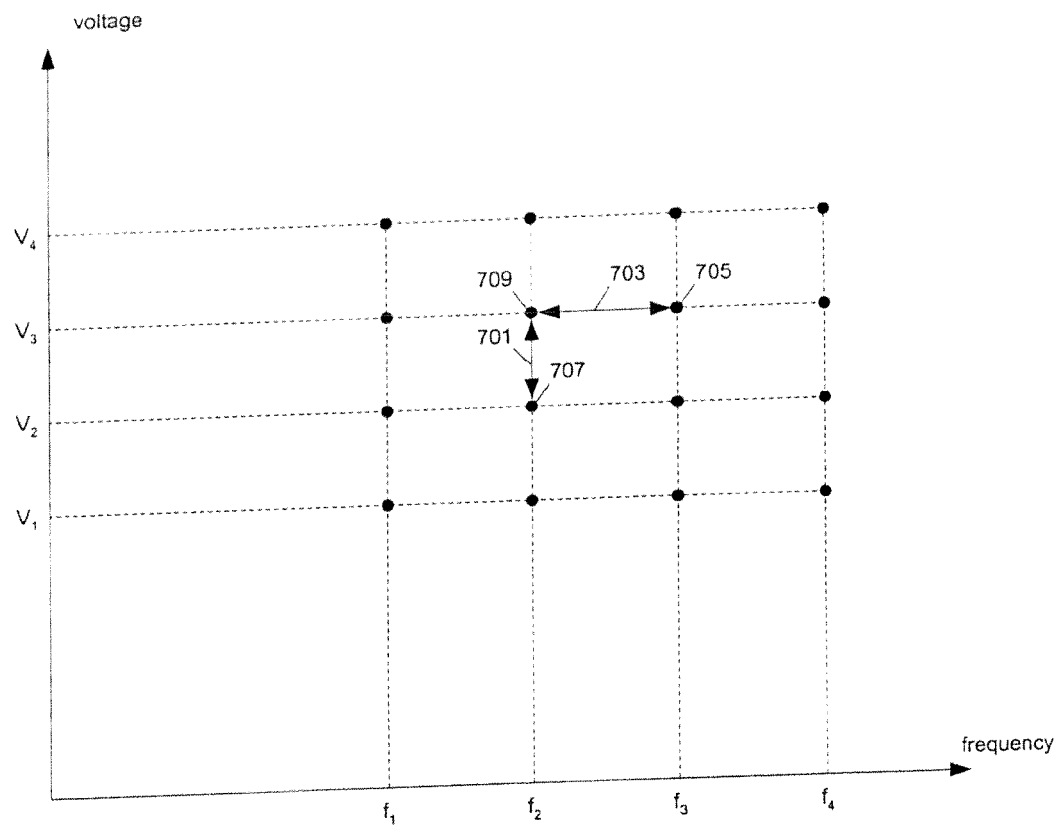
FIG. 7 illustrates transitions from one run state to another run state according to one embodiment of the present invention.

FIG. 7 illustrates transitions from one run state to another run state according to one embodiment of the present invention. In one embodiment of the present invention, the transitions between the different CPU run levels are accomplished using a combination of frequency and voltage control. To increase performance (e.g., to move from Run 707 to Run 705), the CPU core voltage is first increased (701) to the level appropriate for Run 705. The CPU power supply moves the voltage between the two voltage points at a rate slow enough such that it does not induce errors in the running CPU. When the voltage transition is complete, the CPU is currently operating at point 709 in FIG. 7; and, the CPU power supply may signal the system with an interrupt, indicating that it is now safe to increase frequency. At this point, the clock source starts to transition to the new (faster) operating frequency. The clock source slews (slowly changing) the frequency between the two operating points (e.g., 709 and 705) slow enough such that all the Phase Lock Loops (PLL) in the system can track the clock without causing errors in the running system.

Similarly, to decrease performance (e.g., to move from Run 705 to Run 707), the clock source is first instructed to move to the new (slower) operating frequency. The clock source again slews the frequency between the two operating points slow enough such that all the PLLs in the system can track the clock without causing errors in the running system.

Since the operation of slewing the frequency from point 705 to 709 takes a deterministic amount of time, it is possible to have the CPU wait the appropriate delay and then infer that it is operating at point 709. Alternatively, the clock chip can generate an interrupt after achieving the new frequency.

Once point 709 is reached, the CPU core voltage is decreased to the level appropriate for Run 707. The CPU power supply moves the voltage between the two voltage points at a rate slow enough such that it does not induce errors in the running CPU. Since no further action needs to be taken, the voltage transition may be left to complete unmonitored.

In a typical system, the different PLLs in the system have certain inter-relationships. For example, each PLL associated with the CPU may run at a frequency derived from a single, common reference clock. Each of these PLLs also has its own specified minimum and maximum operating frequencies. The individual PLL operating minimum and maximum frequencies imply that each PLL also has a specific minimum and maximum reference frequency that it will accept. In order for the system to work correctly, the reference clock must obey all the individual reference clock minima and maxima. In some cases, the PLL of a device (e.g., core logic) may be reprogrammed during the frequency transition operation to obey the clock minima and maxima of the device.

Figure 8:
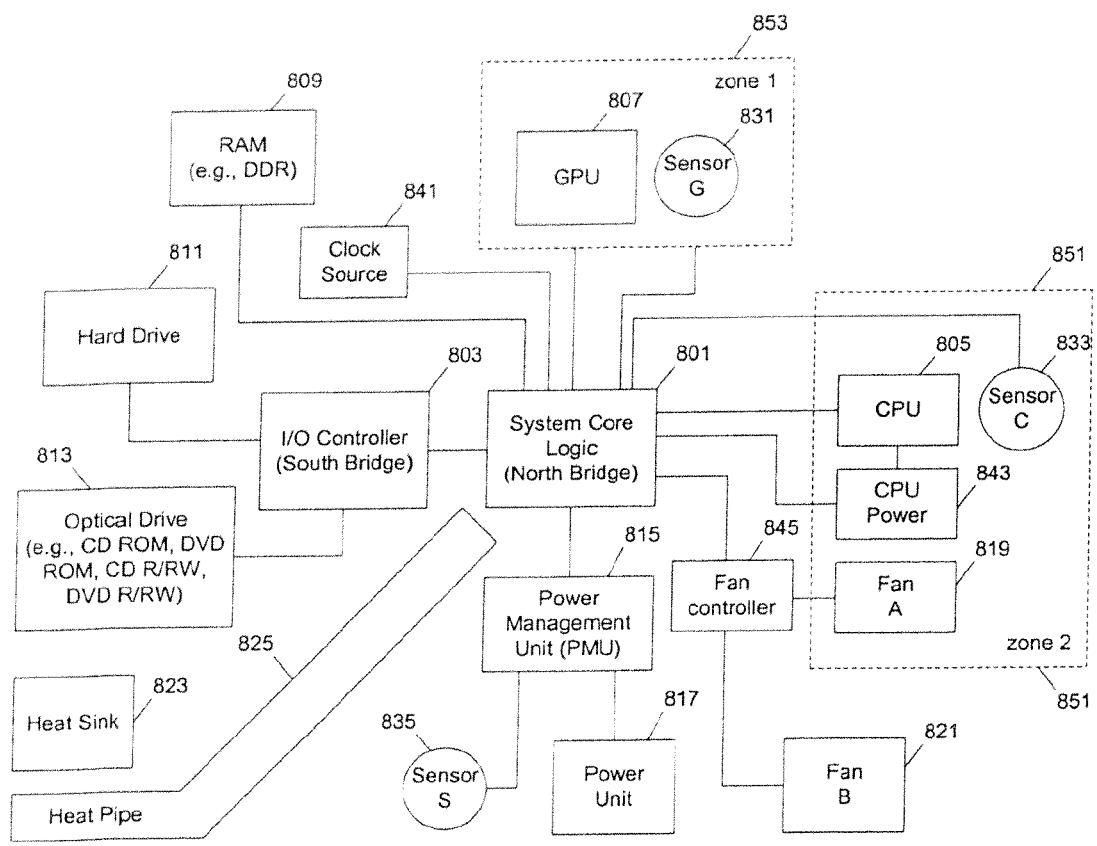
FIG. 8 illustrates a detailed block diagram representation of a data processing system with active power and temperature management according to one embodiment of the present invention.

FIG. 8 illustrates a detailed block diagram representation of a data processing system with active power and temperature management according to one embodiment of the present invention. In FIG. 8, the data processing system contains system core logic 801 (North Bridge), which interconnects CPU 805 and RAM 809. I/O controller 803 (South Bridge) connects core logic 801 with hard drive 811 and optical drive 813 (e.g., CD ROM, DVD ROM, CD R, CD RW, DVD R, or DVD RW) and other I/O devices (e.g., a keyboard, a cursor control device, or others, not shown in FIG. 8). Some components (e.g., CPU 805, GPU 807 and RAM 809) may have elevated temperature after generating significant amount of heat during operation. Some components (e.g., hard drive 811 and optical drive 813) consume more power at a high speed and less power at a lower speed. Heat pipe 825 moves heat from one location to anther to transfer heat; heat sink 823 absorbs heat to regulate temperature; and, under the control of fan controller 845, variable speed fans 819 and 821 can work at different speeds for tradeoff between the rate of cooling and the associated cost (e.g., noise and power consumption). Sensors 831 and 833 monitor the temperate of GPU 807 and CPU 805 for active management of the system according to embodiments of the present invention.

FIG. 8 shows a particular configuration for the illustration purpose. It is understood that different configurations can also be used with various methods of the present invention.

In one embodiment, CPU power 843 is controllable to move the core voltage of CPU 805 from one point to another for the shifting of power consumption level (e.g., along path 701 in FIG. 7); and, clock source 841 is controllable to slew the core frequency of CPU 805 from one point to another for the shifting of performance level (e.g., along path 703 in FIG. 7). When the CPU is working at a lower frequency, the CPU voltage is reduced to save power and reduce heat generation.

In FIG. 8, sensor 831 measures the temperature of GPU 807; thus, GPU 807 and sensors 831 are in thermal zone 853. CPU 805, fan 819 and sensor 833 are thermally coupled in thermal zone 851. Fan 821 may cools power unit 817 and other components sufficiently such that other components may not need active thermal management.

Although the software-based thermal and power management can manage the operations of the system according to combined goals to achieve a best mix, software may crash. Thus, a hardware-based failsafe mechanism is used in one embodiment of the present invention as a backup. For example, sensor 835 may trigger a safety alert when a safety threshold for temperature is reached or exceeded. Note that sensor 835 may be replaced by an output from sensor 833 or 831. Alternatively, sensor 835 may be a circuit which combines the output of sensors 831 and 833 for safety trigger. In one embodiment of the present invention, the temperature sensors can trigger operations (e.g., force the fan to run at the full speed or a shutdown of the system) to prevent thermal runaway (overheating to cause damage), when the temperature is above a threshold. In one embodiment, the sensor sends a signal to the power management unit (PMU 815) when this happens; and, PMU 815 controls power unit 817 for emergency powering off to prevent permanent damage.

In one embodiment of the present invention, software (e.g., a part of the operating system) has the responsibility for keeping all components within their respective thermal specification. The hardware failsafe is intended to prevent a crashed system from destroying itself. As such, the failsafe threshold may be set above a device's maximum operating temperature, as long as it is still below the threshold above which permanent damage may occur.

In one embodiment, PMU 815 implements a forced system shutdown function. When a hardware failsafe trips (e.g., by sensor 835), PMU 815 tries to determine if the CPU is active. One method of determining if the CPU is dead is to use a watchdog timer (e.g., in KeyLargo/K2) to determine whether the CPU response to a signal within a specified time period set for the timer. If the CPU is dead (e.g., not responding to the signal before the timer expires) after the failsafe has tripped, PMU 815 shuts off power to the system.

In one embodiment, when the failsafe triggers, the information about the failsafe shutdown is recorded so that a user can find out about the event at the next boot of the system. If a machine refuses to boot because it detects a misapplied heatsink, the LED emits a code to convey the nature of the failure. Further, when the system cannot be sufficiently cooled, and devices are set to slower operating speeds, the user might be informed that the system's performance is suffering because of the heat.

Heatsinks (e.g., 823) generally provides a valuable time to respond to non-responsive systems. Conversely, misapplied heatsinks can lead to destruction of a CPU in mere seconds. In one embodiment, during boot time, PMU 815 has a thermal trip watchdog timer that shuts off a non-responsive system with a time period before an unsinked device melts down.

In one embodiment of the present invention, the boot ROM code sets the thermal trip points in the thermal sensors for devices that might sustain permanent damage if over a critical temperature for more than a few seconds (e.g. CPUs).

In one embodiment of the present invention, software manages a thermal zone (e.g., 851) by controlling one or more fans (e.g., fan 819 or other "cooling" devices, such as CPU 805 for reduced heat generation) in that zone. The fan control is in the form of speed control, and not simple on or off operations. For example, a signal is sent to control the fan speed by varying duty cycle.

In addition to telling the fan how fast to spin, the software detects whether or not the fan has responded to reliably manage the thermal zone. For example, the software can used the tachometer input from fan controllers to obtain this feedback.

In one embodiment of the present invention, the tachometer feedback is to ensure that the fan begins spinning when first turned on. Fans may run at speeds slower than those required for spin-up. Some fan controllers start the fan at full speed and then backs off. In one embodiment, a better algorithm for spinning up a fan is to slowly increase the duty cycle until the fan starts up, and then slowly back it down to the actual desired fan speed (if slower than the startup speed). Tachometer feedback can be used to implement this algorithm.

In one embodiment of the present invention, a fan is controlled by a fan curve, which describes the relationship between the temperature values of one or more temperature sensors and the speed of the fan. For example, one fan curve specifies that for a given temperature the fan is to run a given speed. In one embodiment, there is one fan curve to map each sensor to each fan for a given performance level; thus, the total number of fan curves is:

(number of sensor and performance level combinations)×(number of fans)

The manager select the maximum speed from the speeds required by all sensors according to the fan curves at the current performance level as the desired fan speed.

In one embodiment of the present invention, the fan curves are determined based on temperature measurements taken at different fan speeds and at different performance levels.

In one embodiment of the present invention, software controls fan speed to manage system thermals. The goal of the software is to run the fan, as slowly and quietly as possible while maintaining device specification. Since a single thermal zone may have multiple hot spots, the software runs the fan at the slowest speed required to keep all hot spots in check, even if it means that one device is cooled more than required in order to keep another device within the specification.

In one embodiment of the present invention, Active Thermal Management software is implemented in the kernel of an operating system. A thermal manager processes input data, including sensed information (e.g., temperature, CPU processing load, GPU processing load), detected conditions (e.g., battery charging, lid closed, sleep mode) and user preferences (e.g., prefer high graphics processing, prefer low noise) to optimize and direct accordingly CPU and/or GPU processing levels, battery charging periods, fan speeds and drive performance. Thus, the management system integrates the inputs from sensors, user preferences, current tasks and other conditions like lid closed operation to determine the optimum way to keep the temperature of the system within a desired range by increasing the cooling or decreasing the heat produced. In at least one embodiment, users of the data processing system can manage their own thermal solutions through the thermal management software modules implemented on the data processing system (e.g., by setting the user preferences).

Figure 9:
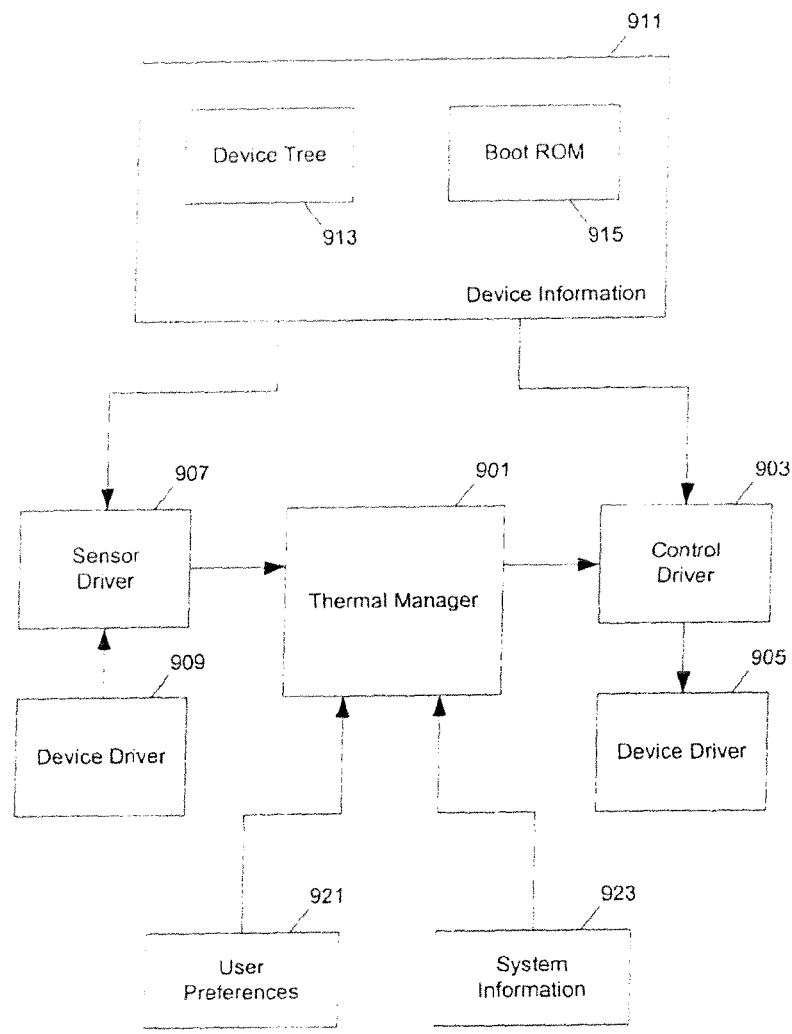
FIG. 9 shows a software module diagram which shows software to manage the operation state of a data processing system according to one embodiment of the present invention.

FIG. 9 shows a software module diagram which shows software to manage the operation state of a data processing system according to one embodiment of the present invention. In one embodiment of the present invention, a thermal management software system includes several modules, including sensor driver 907, thermal manager 901, and control driver 903. Thermal manager 901 performs the central decision-making. Sensor driver 907 communicates with device driver 909 to obtain sensed information; and, control driver 903 communicates with device driver 905 to adjust working states of one or more components (e.g., CPU, GPU or fan). In one embodiment of the present invention, device information 911 from the device tree 913 and Boot ROM 915 are collected for the instantiation of sensor driver 907 and control driver 903 during the initialization period.

In one embodiment of the present invention, the thermal manager monitors and controls the internal temperatures of the data processing system, on which the operating system is running, to prevent uncomfortable or unsafe temperatures. Certain parts, like the processor and graphics hardware, are more prone to overheating than others. Other components, like optical and hard drives, may fail due to excessive heat in the system. In order to monitor the temperatures of particularly hot components, the thermal manager (901) obtains temperature information about them from sensor drivers (e.g., 907). Based on the temperature information, the operating system instructs control drivers (e.g., 903) to take action to mitigate temperature increases as necessary in a coherent fashion.

In one embodiment of the present invention, thermal manager 901 contains a set of global rules that dictate how to manage the system: whether to manage more heavily, stay the same, or manage less heavily. For example, a thermal manager may contain a Cooling Decider to determine the amount of cooling adjustment required based on the information obtained from sensor driver 907, a priority decider to prioritize a list of controls according to user preferences 921, system information 923, and a control decider to adjust the controls according to the prioritized list of controls to achieve the determined amount of cooling adjustment. For example, the Cooling Decider takes sensor value data and calculates how much it should turn the system cooling up or down. Specific rules that represent additional criteria, such as user preferences and environmental factors, are used to prioritize the available controls for use in the determination of control indices. The Priority Decider creates a sorted list of controls ranked in the order they should be changed according to these rules. The Cooling Decider passes the desirable cooling change and any relevant information, such as the target thermal zone in which the cooling change is to be implemented, to a Control Decider, which implements the desirable cooling change. The Control Decider takes the amount of cooling determined by the Cooling Decider and parcels out those changes to the controls in the order determined by the Priority Decider. In one implementation, this decision-making happens at polled intervals.

In one embodiment of the present invention, thermal manager 901 employs Fuzzy Logic and other data-driven algorithms to manage system temperature. For example, the Cooling Decider uses fuzzy logic principles and inference rules to determine the amount of cooling change, instead of modeling the system mathematically, in which the fuzzy logic model is empirically derived and modified through testing or simulation. An example of a rule is:

IF (temperature is hot) AND (temperature is increasing) THEN (turn cooling up).

After a number of rules are evaluated, their results are combined to generate a single result. Terms like (temperature is very hot), (temperature is increasing) or (turn cooling up a lot) can be defined for better precision in control.

For example, a Cooling Decider may use the following rules.

IF (temperature is cold) THEN (turn cooling down)
IF (temperature is warm) THEN (do nothing)
IF (temperature is hot) THEN (turn cooling up)

Figure 10:
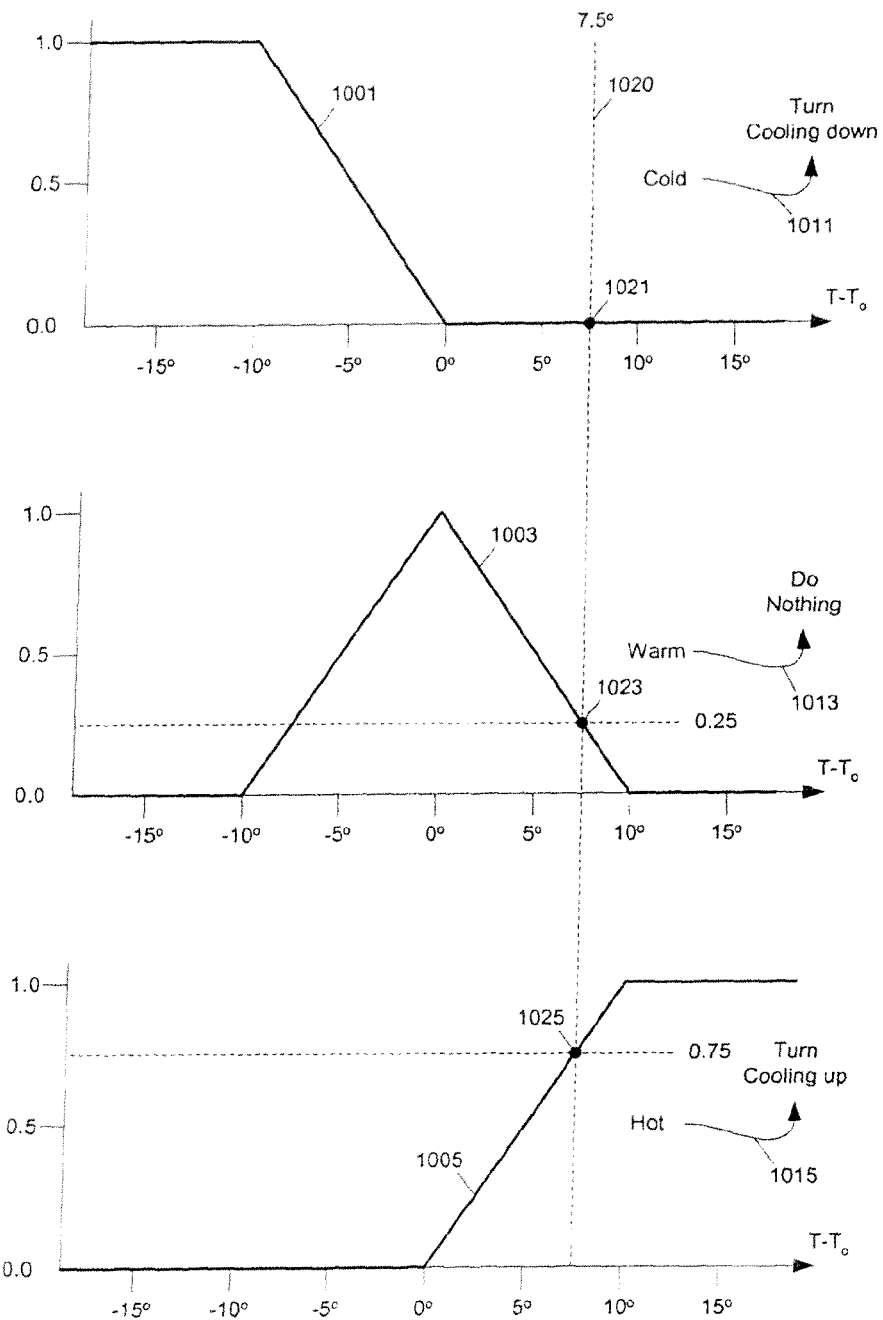
FIG. 10 illustrates an example of a method to determine actions to be performed using fuzzy logic in operating a data processing system according to one embodiment of the present invention.

FIG. 10 illustrates an example of a method to determine actions to be performed using fuzzy logic in operating a data processing system according to one embodiment of the present invention. A sensed temperature may be classified non-exclusively as cold, warm and hot. For example, if the current temperature is a number of degrees below the desired temperature, it can be classified mostly warm and a little cold. In FIG. 10, membership functions 1001, 1003 and 1005 define the levels of truth for the classification of different temperatures. For example, curve 1001 represents the level of truth for different temperatures. When the different between the current temperature and the target temperature, $T-T_o$, is between $-10°$ and $0°$, the truth value increases linearly as the current temperature reduces (and decreases as the current temperature increases). When the current temperature is $10°$ below the target temperature, the truth value of being cold is 1.0; and, when the current temperature is above the target temperature, the truth value of being cold is 0.0. Curve 1003 defines non-constant truth values of warm when the difference between the current temperature and the target temperature ($|T-T_o|$) is less than $10°$; and, curve 1005 defines the linear variation of truth values of hot when the current temperature is within $10°$ above the target temperature. Thus, if a current temperature is $7.5°$, the truth values for cold, warm and hot are 0, 0.25 and 0.75 (1021, 1023 and 1025) respectively. The above rules for the cooling decider then lead (1011, 1013 and 1015) to the corresponding truth values 0, 0.25 and 0.75 for the actions (turn cooling down), (do nothing) and (turn cooling up) respectively, when the above inference rules are used.

Membership graphs may be of complex shapes, such as Gaussian curves. Keeping them to triangles and trapezoids makes the calculations much faster.

Figure 11:
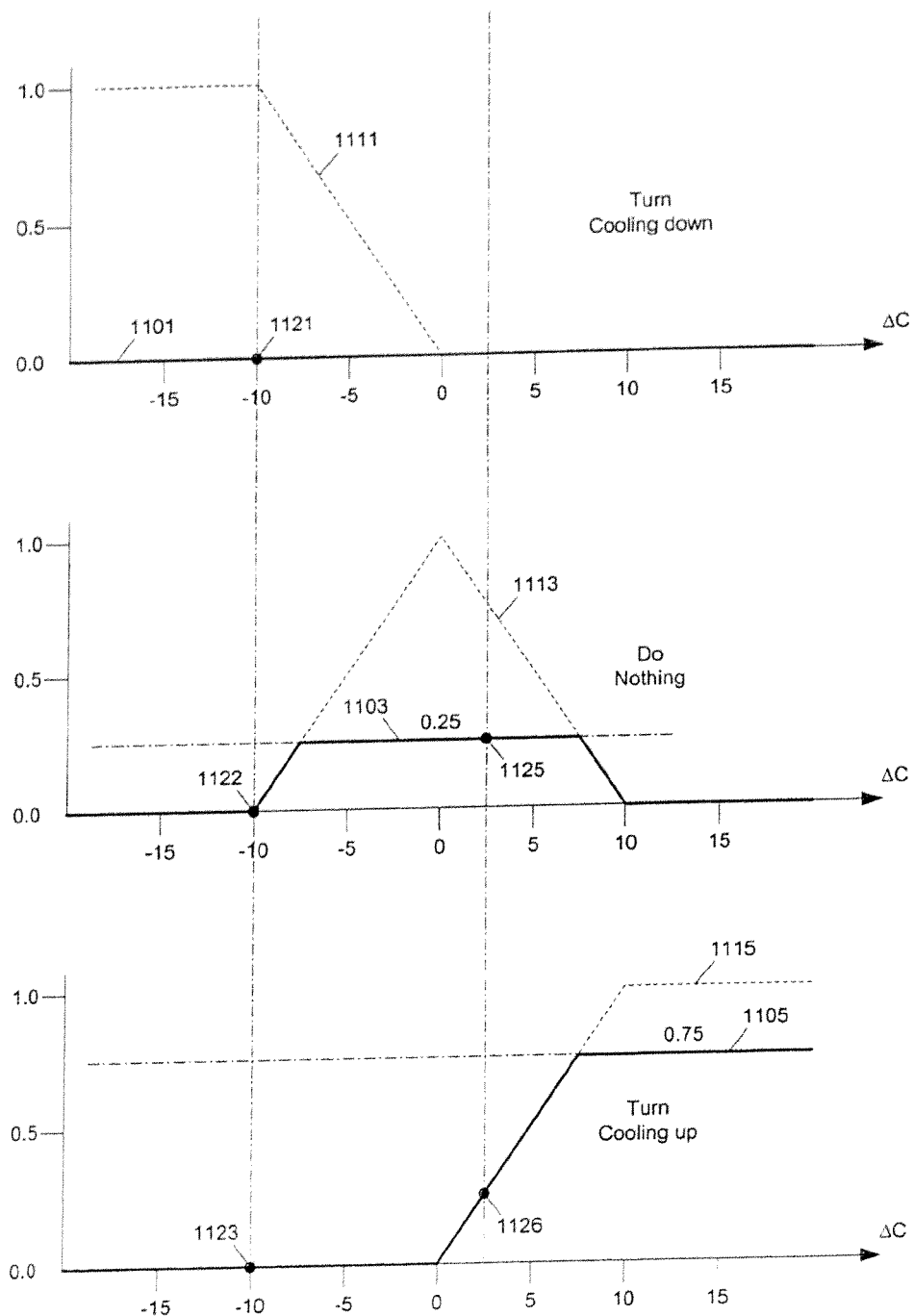
FIGS. 11 and 12 illustrate an example defuzzification method to merge different actions as one quantified action to operate a data processing system according to one embodiment of the present invention.
Figure 12:
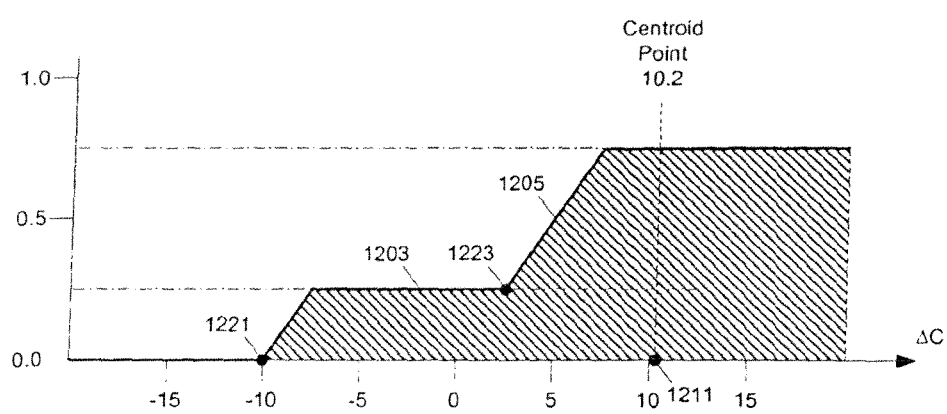

FIGS. 11 and 12 illustrate an example defuzzification method to merge different actions as one quantified action to operate a data processing system according to one embodiment of the present invention.

To merge the different results, the Cooling Decider goes through a process called "defuzzification" to get a single, crisp result in the range of ±20 units for the cooling, assuming the change of cooling is always limited within 20 units. Consider an example in which the actions of (turn cooling down), (do nothing) and (turn cooling up) have member functions 1111, 1113 and 1115 respectfully, as shown in FIG. 11. In FIG. 11, when cooling is turned down by no more than 10 units, the truth value of (turn cooling down) increases linearly as the unit of cooling decreases; when cooling is turned up by no more than 10 units, the truth value of (turn cooling up) increases linearly as the unit of cooling increases; and, when the change in cooling ($|\Delta C|$) is less than 10 units, (Do nothing) has non-constant truth value.

Note that the shapes, ranges and slopes of member functions 1111, 113 and 1115 for (turn cooling down), (do nothing) and (turn cooling up) are in general different from those for cold, warm and hot.

A commonly used method for "defuzzification", called the Centroid algorithm, first clips each consequent (result) by the degree of truth of its antecedent. Since (turn cooling down), (do nothing) and (turn cooling up) have truth values 0, 0.25, 0.75 respectively, member functions 1111, 1113 and 1115 are clipped to generate functions 1101, 1103 and 1105 respectively.

Next, the clipped member functions are overlaid as in FIG. 12 to calculate an average point where there is an equal area under the graph on each side of the average point. This is analogous to finding the center of mass in physics and is called the Centroid Method. Curve 1203 in FIG. 12 corresponds to the portion of curve 1103 between points 1122 and 1125 in FIG. 11; and, curve 1205 corresponds to the portion of curve 1105 beyond point 1126. The average point 1211 in FIG. 12 is at 10.2 unit. Thus, the Cooling Decider reaches the conclusion to turn up cooling for 10.2 units.

The priority decider and the control decider then determine how to turn up cooling for 10.2 units.

There are at least two kinds of data that are taken into account in deciding the priority ordering of controls: thermal zone and control type. For example, a system might have two fans: a CPU near one fan, and a GPU near the other. In this example, there might be two thermal zones, one specifying the CPU and its associated fan, and the other specifying the GPU and its fan. However, the fans, CPU, and GPU are different types of thermal controls: they create different side effects when in modulating the temperatures. Therefore, they are associated by type of control (e.g., fan, processor, etc). Each type of control has certain known properties, depending on the user's preferences or current environmental factors.

The Priority Decider prioritizes the controls by type and zone into a single priority queue for the Control Decider to adjust. For example, the list can be determined by user profiles, like "quiet" and "high performance." These profiles sort the controls by type. Within a type, the controls can be ordered by proximity to hot sensors: if a particular control is closer to the hot sensor than another similarly-typed control, it will have a higher priority. However, differently-typed controls are sorted according to profiles, not zones.

In one embodiment of the present invention, the Priority Decider is based on an expert system, which takes in dynamic system information and applies it to a list of rules to determine the priorities of the controls. The rules for the Priority Decider include system environmental rules and user preference rules. A level of priority indicates that the level of importance of the work of the device. Examples of system environmental rules include:

If intake temperature is high, decrease the fan's priority
If battery is charging and is above 90%, increase the battery charger's priority
If CPU load is low, decrease the CPU's priority
If zone x is hot, use controls in zone x first
If graphics pipeline is busy, decrease the GPU's priority
If DVD is playing, decrease the CPU's priority
If burning CD/DVD, decrease the CPU's priority
If filesystem is busy, decrease the hard drive's priority
If sensors are too hot, don't burn CD/DVD
If CPU speed is too slow, can't burn CD/DVD
Examples of user preference rules include:
If "quiet," decrease the fan's priority
If "high performance," decrease the CPU's priority
If "high performance," decrease the GPU's priority The Control Decider adjusts the list of controls to achieve the required cooling change determined by the Cooling Decider, according to a list of controls ranked by the Priority Decider in the order they should be changed. In one embodiment, the cooling change that the Cooling Decider provides can be considered as the quantity of total control index change to be made, with 0 being no cooling change, positive representing more aggressive cooling, and negative representing less aggressive cooling.

For example, if the Cooling Decider determines to increase cooling for a number of units, the control with the lowest priority is adjusted first (e.g., to reach the maximum cooling capacity if necessary) to provide the required cooling. If the required unit of cooling is not satisfied after the total cooling capacity of the control with the lowest priority is exhausted, the control with the next lowest priority is adjusted. Thus, the list of controls is processed in the ascending order of priority for adjustment until the required units of cooling is satisfied.

Similarly, if the Cooling Decider determines to decrease cooling for a number of units, the control with the highest priority is adjusted first (e.g., to reach the minimum cooling capacity and maximum performance) to accommodate the decrease of cooling. If an extra number of unit of cooling is available for decreasing after the cooling provided by the control with the highest priority reaches the minimum, the control with the next highest priority is adjusted. Thus, the list of controls is processed in the descending order of priority for adjustment until the given units of cooling is decreased.

In one embodiment of the present invention, the number of cooling units to be changed can be zero, with the changed priorities of the controls. To reflect the changes in priorities, the cooling units may be traded between controls of different priorities to achieve better performance. For example, if high priority control A is providing more cooling than low priority control B, the high priority control A is adjusted for higher performance but less cooling, while the low priority control B is adjusted to provide more cooling to compensate for the reduced cooling from control A.

In one embodiment of the present invention, the information about sensors and controls in the system (e.g., type, zone, and others), environmental parameters (e.g., high/low temperature thresholds), membership functions and inference rules required by the Cooling Decider, priority lists of controls needed for various user-affected settings, and others are collected (e.g., from device tree 913, Boot ROM 915) during an initialization period (e.g., at startup) of the management system.

Figure 13:
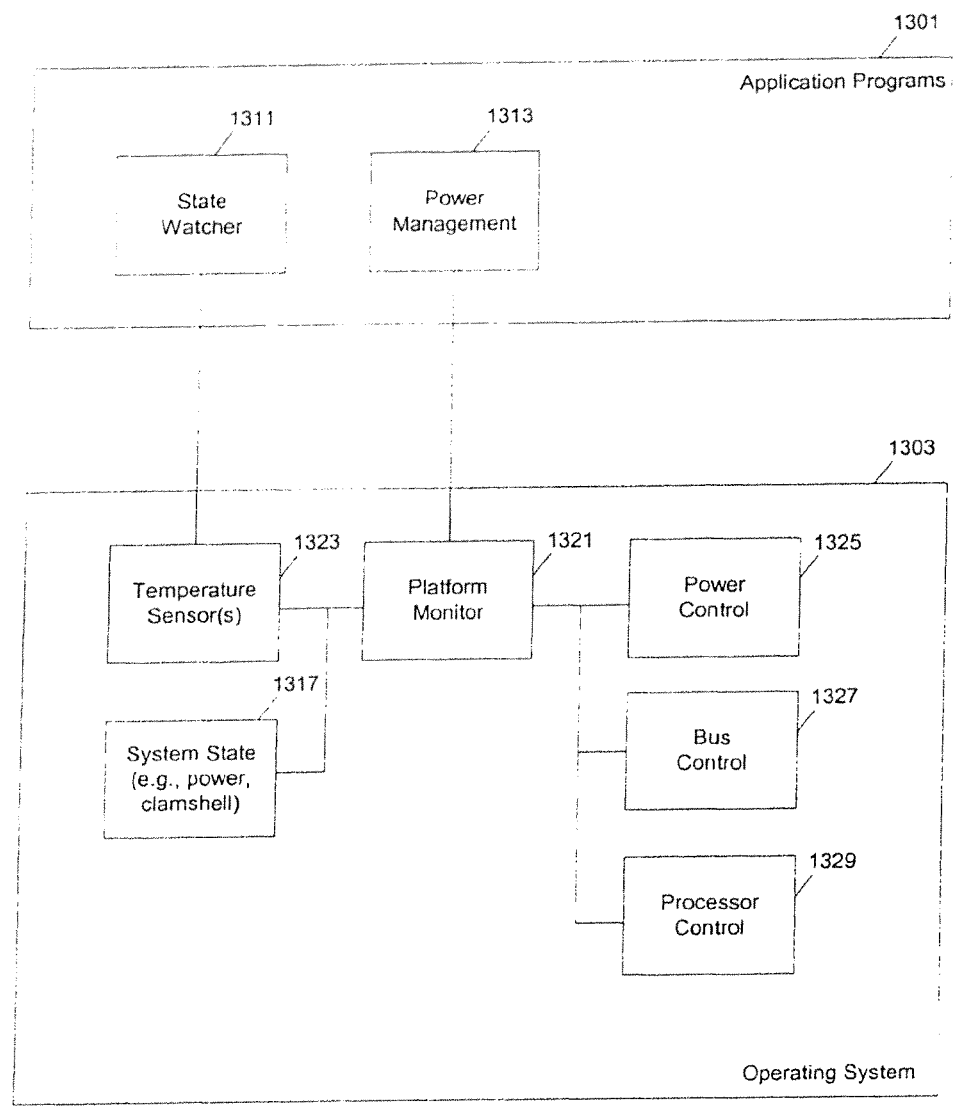
FIG. 13 shows a software module diagram which shows software to manage the operation state of a data processing system according to one embodiment of the present invention.

FIG. 13 shows a software module diagram which shows software to manage the operation state of a data processing system according to one embodiment of the present invention. In one embodiment of the present invention, thermal manager manages system temperature through making simple decisions based on the temperature sensors and adjusting the CPU and GPU performance accordingly. In one embodiment, the thermal manager is a platform dependent driver (e.g., platform monitor 1321) that responds to events generated by sensor drivers (e.g., in response to excessive thermal loading), power management requests (e.g., from power management 1313), or configuration changes from the user to modify the behavior of the system (e.g., by adjusting the working states of the components of the data processing system through controls 1325, 1327 and 1329). The thermal manager monitors the environmental factors (e.g., using sensors 1323) and takes necessary action to prevent damage to machine components or loss of user data.

In one embodiment of the present invention, state watcher 1311 allows a user to monitor sensors and observe the behavior of the thermal manager. This tool may be used to report all relevant data from the thermal management system, as well as make runtime tweaks to parameters in the system. For example, the user can see what the system would do if it were at a certain temperature or a certain state and set thresholds and polling periods for the individual sensors.

In one implementation, platform monitor 1321 implements a state machine, which in response to the input, adjusts various system parameters in order to adjust the level of cooling needed for the computer system. The knowledge about the temperature being managed and what constitutes too hot versus too cold are coded in the platform monitor. In one embodiment of the present invention, the platform monitor determines the current state of the system from the information obtained from the sensor drivers and adjusts the thermal controls of the system to move the system from one state to another, if the current state is not a desirable one. For example, the states are determined from the information collected from sensors (e.g., temperatures sensors), system conditions (e.g., lid open or closed), and preferences (e.g., "quiet" or "high performance"). There may also be different profiles for lid-closed, "quiet", or other situations so that the monitor actively manages the system to move between the states in the current profile. The platform monitor is platform specific and has detailed knowledge of the platform on which it is running. Using this knowledge, it collects information from sensors in the system and takes appropriate actions based on the states of these sensors.

Sensor drivers provide environmental information about the computer. An instance of a sensor driver represents a specific environmental-sensing device, like a thermistor, an ambient light sensor, or a software sensor like kernel load factor. For example, temperature sensors provide temperature information about the data processing system on which the sensor drivers are running. A sensor driver gets information about the sensor (e.g., thermal zone, type (such as temperature, light, battery, kernel load), thresholds, and others). Sensor drivers can be polled to get the current values and may support event notification to signal important threshold conditions.

A sensor driver (e.g., 907 or 1323) may apply to any sensor that detects one aspect of the state of the system. For example, the user selecting "Reduced performance" in the Energy Saver preference panel is sensor input. Whether the user has open or closed the clamshell is sensed information about the environment of the data processing system. Any input may trigger a response that dictates a state change of the system; and, the platform monitor is the centralized decision maker for taking actions to adjust the state of the system.

In one embodiment, each sensor registers itself with the manager (e.g., platform monitor 1321 or thermal manager 901). For some sensors, such as temperature sensors, the manager sets a threshold that controls when the sensor driver notifies the manager. For example, a temperature sensor may be given an upper threshold and a lower threshold so that the sensor driver notifies the manager whenever the sensed temperature crosses one of those thresholds. The sensor may be a smart one so that it triggers an interrupt when a threshold is crossed. Alternatively, the sensor driver may simulate this behavior by polling the sensor and only notifying the platform monitor when a threshold is crossed.

Based on the current state of the system, the manager may reset thresholds to control the behavior of the sensor. The thresholds can be set to control the responsiveness of the system and manage hysteresis. For example, when an upper threshold for a temperature is crossed, the upper and lower thresholds may be increased so that the current temperature is within the updated thresholds. The manager notices the shift in the temperate and takes actions to adjust heat removal (e.g., increasing the speed of a fan) and/or heat generation (e.g., reducing the performance and power consumption level of CPU or GPU) to bring the temperature back down, if temperature is too high. Similarly, when the temperature crosses the lower threshold, the upper and lower thresholds may be decreased so that the current temperature is within the updated thresholds.

In one embodiment of the present invention, a sensor driver notifies the manager with a sensor value (e.g., scaled to the range 0-100) when an interesting event occurs, or when the manager polls the sensor. The sensor value is not necessarily the same as the raw data from the sensor; the sensor driver can take into account other prioritized information from the sensor, e.g., how long a thermistor has read the temperature. For example, the sensor driver can keep a history of its data and/or values. However, hysteresis or historical data is not generally required, since the manager can retain any data it needs.

Some sensors may be hardwired to cooling devices, like fans, that are outside of the control of the Thermal Manager, but still notify the system when a cooling change has occurred.

In one embodiment of the present invention, controlling the fan speed is accomplished by utilizing the hardware capabilities (e.g., using ADM1030 from Analog Devices). ADM1030 fan controller contains an on-chip thermistor, support for a remote (off chip) thermistor, and is programmable to drive a variable speed fan. In one embodiment of the present invention, a generic temperature sensor driver is responsible for communicating sensor events to the platform monitor. In order to perform specific tasks, the device drivers are instructed to carry out device-dependent actions (e.g., reading the temperature from an ADM1030). An instance of the generic driver has a low threshold and a high threshold for monitoring temperature, a specified polling period for periodically polling the temperature information, and other attributes, such as name, value, temperature zone, type of sensor. The thresholds may be modified and be disabled (e.g., by setting to a predetermined value) or enabled during runtime.

In one embodiment of the present invention, the generic temperature sensor driver initializes itself and waits for the manager to be loaded during start up. It then sends a message to the manager telling it where it is. The manager then also registers as a client of the sensor driver to establish communication. The sensor driver sends a message to the manager when an interesting event occurs, such as a threshold that has been hit or exceeded, or when the manager polls the sensor for the current value. In one embodiment of the present invention, the generic temperature sensor driver is a generic liaison driver. It obtains the actual value for the sensor by talking to a specific device driver.

Control drivers are the actual effectors of the state change. Examples of these include drivers that can change CPU multiplier, system bus speed, or GPU performance level. In one implementation, some of these controls are linked into the manager (e.g., platform monitor).

In one embodiment of the present invention, an instance of a control driver represents a device that is able to adjust its working state for environmental variation, including devices that are designed for removing heat, such as fans, or devices that can adjust their performance to reduce heat generation. Control drivers may be visualized as a dial for the output of the device they're controlling. In one implementation, a control driver accepts a value for the dial (e.g., indicating a working state as a index value within 0-100, with higher values representing most aggressive cooling and lower values representing least aggressive cooling); and, the control driver also supports reporting its current index value and information about whether it is at the maximum or minimum control level.

The devices that can have a corresponding control driver include: CPU, GPU, fan, backlight, battery charging, hard drive, optical drive, PCI card, and others. CPU and GPU can be of a type of "performance hit" for which different working states correspond to different tradeoff in performance and heat generation (or power consumption); fan can be of a type of "noisy" for which different working states correspond to different tradeoff in heat removal (and noise) and power consumption; backlight and battery charging can be of a type of "user impact" for which different working states correspond to different tradeoff in user experience impact and power consumption.

The CPU clock is generated for some CPUs via an on-chip PLL that selectively multiplies and divides the processor bus clock. However, the CPU clock PLL configuration of many microprocessors is only programmable during a reset cycle. Thus, these CPU may be rebooted in order to change clock speeds. The special reset cycle for changing clock may be accomplished by programming a register in the memory controller for state initialization and then sending a command to the PMU for a reset.

The latency for switching the CPU multiplier is very high when a complete reset of the CPU is performed. In such an implementation, interrupts can be deferred for a period of time until the CPU reset is complete. This high interrupt latency can be evident to the end use in the form of audio drop outs and/or pops. Thus, such a method for CPU speed switch is generally not transparent without affecting the user experience. In one embodiment of the present invention, such an approach for CPU multiplier shift is used primarily to cope with excessive thermal stress.

To achieve a more transparent CPU speed change, the CPU clock is altered through slewing (slowly changing) the bus clock. Some microprocessors derive their clock from the system bus clock using an on-chip PLL. In one embodiment of the present invention, the processor clock is changed, without a reset, through slowly changing the processor bus clock at a rate slow enough to allow the on-chip PLL remain locked. One technical challenge is that changing the bus clock has the side effect of changing the rate at which the decrementer register is modified. In one embodiment of the present invention, several hardware components are used to implement CPU speed adjustment through slewing the bus clock, including a programmable clock source (e.g., Cypress CY28512) to support slewing and a circuitry in the core logic to handle the time base drift problem. Some CPUs have a signal called "TBEN" (Time Base ENable), which can be used to temporarily stop the processor from keeping track of time. Custom logic inside the core logic modulates (changes) the TBEN signal in response to monitoring the master clocks. As a result, the CPU concept of time is updated at a constant rate, even though the bus clock changes with time.

In one embodiment of the present invention, a chip (e.g., CY28512) is used to take in a clock signal, apply some user-programmable multipliers to it, and output the clock signal at the resulting frequency. The formula that the chip uses to calculate the output frequency is as follows:

$$\text{Output Frequency} = \text{Input frequency} * (N/M)$$

The N and M values (along with some other options) are user programmable. For better usability, some chips (e.g., CY28512) accept two separate pairs of N and M values, and provides a way to switch between them. At initialization time, one pair is programmed with a set of "low" multipliers for the generation of a low output frequency, and the other pair with a set of "high" multipliers for the generation of a high output frequency. While the system is running, a control driver can toggle between them dynamically to effectively turn the clock frequency up and down. To slew the frequency slowly enough so that the on-chip PLL of the CPU can follow the frequency change, a number of frequency changes can be performed in small steps.

One advantage of lowering the clock frequency is that it allows the system to run at a lower voltage than normal to save power and reduce heat. Thus, after turning the clock down, the control driver can also turn the voltage down.

Some Graphics Processing Units (GPU) (e.g., the nVidia GeForce4Go (NV17M)) have a variety of power saving features designed (e.g., with a mobile application in mind). Some of these features are automatic; and, others are manually settable. For example, NV17M allows the chip to turn off unneeded areas to save power when they are not being used. Unused blocks can power down, as they are not needed. For example, the driver to an unattached display can be powered off if a second display is not attached, or the MPEG decoder cell turned off if there is no need for it. The hardware clock saves power during tiny fractions of a second when the graphics hardware is not being used to its fullest.

The configurable feature of the NV17M is the ability to modify the swap interval. The swap interval defines the maximum number of frames the GPU renders per second. It also defines the number of screen refreshes between redraws. The overall effect is a change in GPU workload, which may also change the workload of the CPU. For example, the GPU may be configured to work at swap interval of 0 without power saving, at swap interval of 1 to generate frames at no faster than the display refresh rate, or at swap interval of 2 to generate frames at half the display refresh rate. In one embodiment of the present invention, the configurable swap interval is manipulated to limit temperature.

In one embodiment of the present invention, devices that act as sensors or controls are described in the device tree with a set of properties added to the nodes in the device tree, such as the type of sensor (i.e. temperature), a unique sensor ID, and the thermal zone of the sensor, location, polling period, and others. During the initialization period, control drivers and sensor drivers obtain this information from the device tree. For example, a control driver gets from the device tree information about the control, such as thermal zone, attributes (e.g., performance hit, noisy, cooling device), type of control (e.g., fan, processor, etc). The manager uses this information in determining the instantaneous index value for each control when new sensor values arrive. When an instantaneous index is received from the manager, the control driver communicates with one or more device drivers to adjust the control as necessary.

A state manager connects the sensor drivers and the control drivers to manage the working states of the components to provide the desirable result. For example, the levels of power and temperature dynamics may be control by the manager to best perform the current task within power and thermal constraints. The manager chooses the most relevant thermal controls to adjust, as well as how much to adjust. When some sensors indicate that they are at a particularly low temperature, the polling of these sensors may be stopped after setting a threshold at which the sensors notify the system to restart polling them.

While the modules are functionally very independent, they may be in separate drivers or combined drivers. For example, some hardware device, such as fan controllers, may a combined sensor and control driver. If the only temperature of interest is the highest one of a number of thermistors, they may be combined into a single sensor. Further, the Cooling, Priority and Control Deciders may be just sets of routines within a single code module. From this description, a person skilled in the art can envision many different combinations, modifications and variations.

Figure 14:
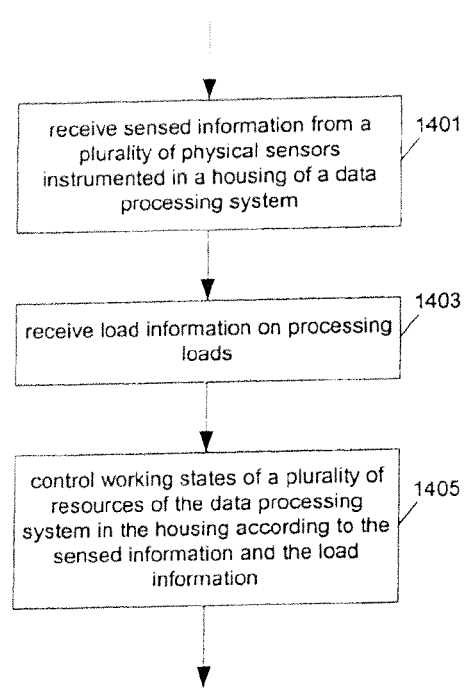
FIGS. 14-16 show methods to operate a data processing system according to embodiments of the present invention.
Figure 15:
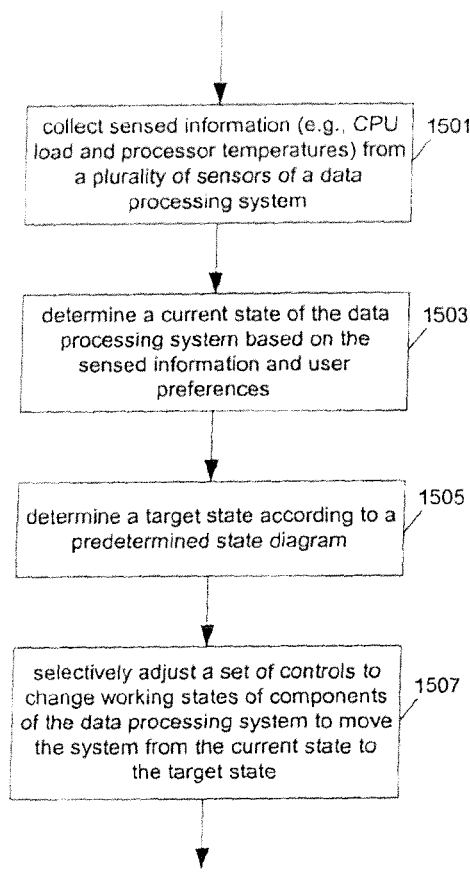
Figure 16:
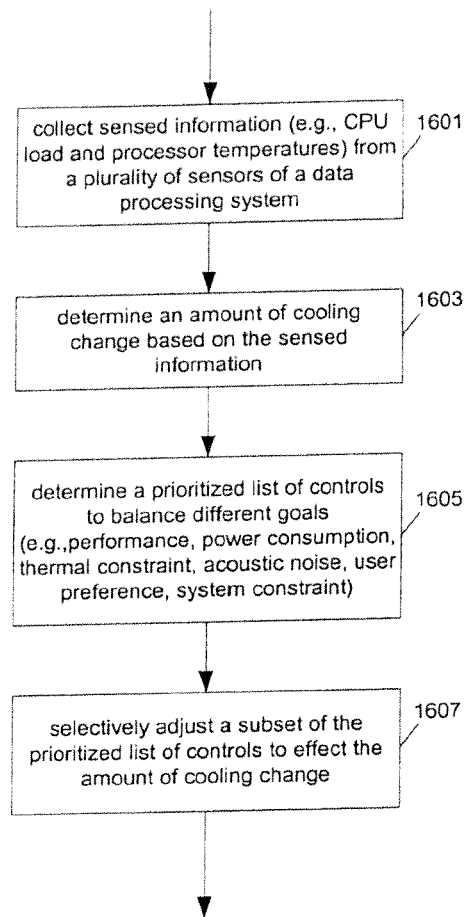

FIGS. 14-16 show methods to operate a data processing system according to embodiments of the present invention.

In FIG. 14, operation 1401 receives sensed information from a plurality of physical sensors (e.g., thermistor, tachometer) instrumented in a housing of a data processing system. Operation 1403 receives load information on processing loads (e.g., CPU load). Operation 1405 controls working states of a plurality of components of the data processing system in the housing according to the sensed information and the load information. The sensed information and the load information can be used to fine grain control the components to balance different goals, such as high performance, low power consumption, low acoustic noise, thermal constraints, user preferences, system design constraints, and others.

In FIG. 15, after operation 1501 collects sensed information (e.g., CPU load and processor temperatures) from a plurality of sensors of a data processing system, operation 1503 determines a current state of the data processing system based on the sensed information and user preferences. Operation 1505 determines a target state according to a predetermined state diagram. Operation 1507 selectively adjusts a set of controls to change working states of components of the data processing system to move the system from the current state to the target state. The state diagram may be pre-designed to specify control adjustments for transition from one state to another to balance different goals.

Figure 18:
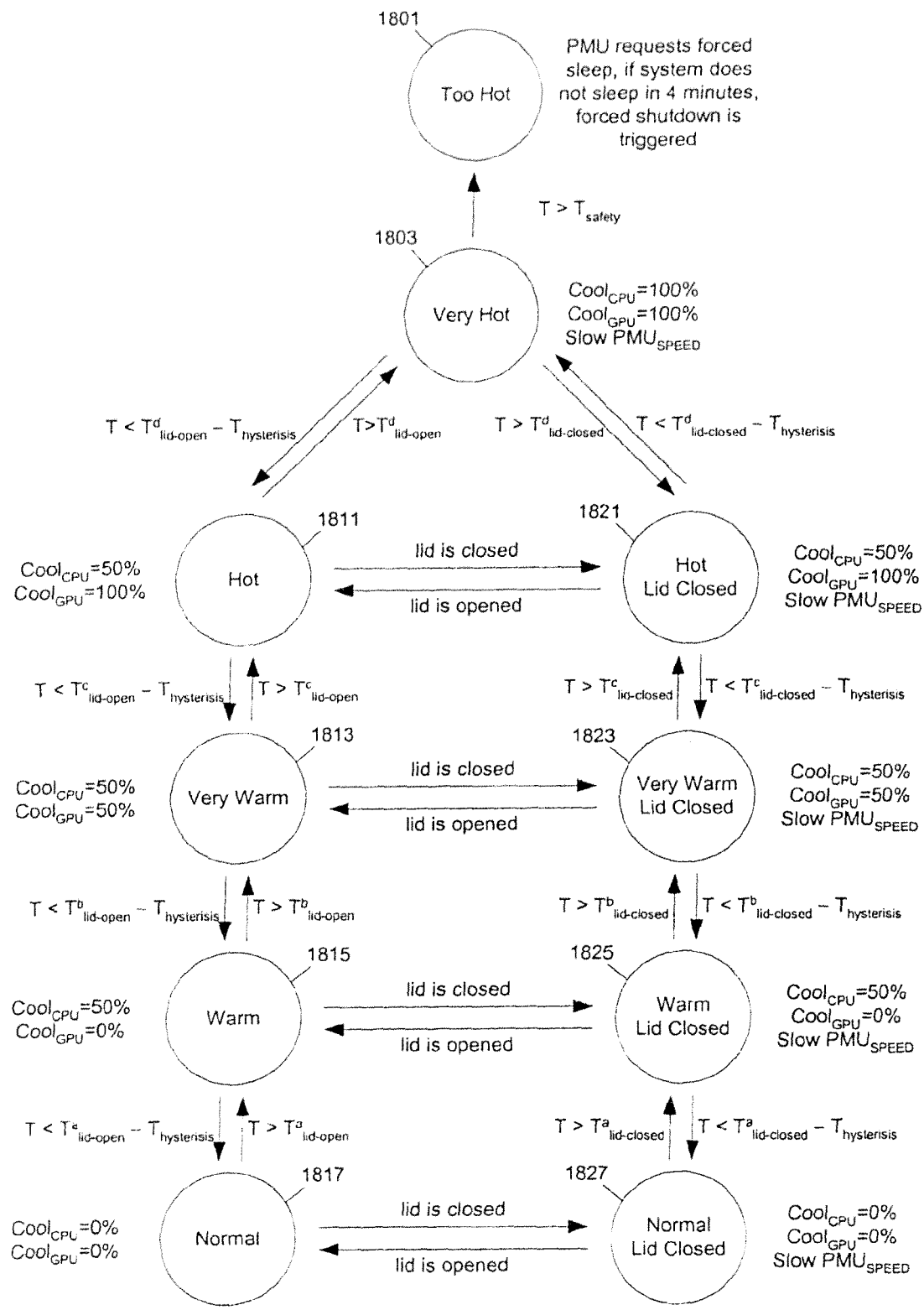
FIG. 18 illustrates an example of a state diagram which shows a way to operate a data processing system according to one embodiment of the present invention.

FIG. 18 illustrates an example of a state diagram which shows a way to operate a data processing system according to one embodiment of the present invention. In one embodiment of the present invention, the state of the system is determined from the temperature and the position of the lid. When the temperature is in the normal range, the system is either in state 1817 if the lid is in the open position or in state 1827 if the lid is in the closed position. When the system is in state 1817 or 1827, the system is allowed to operate at a maximum performance level. For example, the cooling provided by the CPU is at the lowest level (e.g., 0%), allowing a fast dynamic speed and the maximum computation performance; and, the cooling provided by the GPU is also at the lowest level (e.g., 0%). It is understood that the cooling provided by a processor (e.g., CPU or GPU) can be achieved through adjusting the working state of the processor to reduce the power consumption and the associated heat (e.g., through reducing the clock frequency and the core voltage). However, in one embodiment, when the lid is closed, the PMU is forced to run at a slow speed. As the temperature T increases to pass thresholds $T^a_{lid\text{-}open}$, $T^b_{lid\text{-}open}$, $TC_{lid\text{-}open}$, and $T^d_{lid\text{-}open}$, the state of the system transits from state 1817 (normal) to states 1815 (warm), 1813 (very warm), 1811 (hot), and 1803 (very hot), if the lid is open. Similarly, as the temperature T increases to pass thresholds $T^a_{lid\text{-}closed}$, $T^b_{lid\text{-}closed}$, $T^c_{lid\text{-}closed}$, and $T^d_{lid\text{-}closed}$, the state of the system transits from state 1827 (normal, lid closed) to states 1825 (warm, lid closed), 1823 (very warm, lid closed), 1821 (hot, lid closed), and 1803 (very hot, lid closed), if the lid is closed. As the system goes into the states of high temperatures, the working states of the components of the system may be adjusted to cool down the system. For example, when in state 1815 (1825, 1813, 1823, 1811 or 1821), the cooling of the CPU may be adjusted to a higher level (e.g., 50%) to trade performance for cooling. For example, the CPU may be forced into a slow dynamic speed. Further, when in a very hot state (1803), the working state of the CPU may be adjusted to provide maximum cooling (e.g., 100%). Similarly, when in state 1813 (or 1823), the cooling of the GPU may be adjusted to a higher level (e.g., 50%) to trade performance for cooling; and, when in state 1811 (1821, or 1803), the working state of the GPU may be adjusted to provide maximum cooling (e.g., 100%). To provide cooling from the graphics system, DVD (or other optical drive) speed may be reduced. When the temperature exceeds the safety threshold (e.g., $T > T_{safety}$), the system moves into a too hot state (1801), in which state PMU initiates a request for forced sleep. If the system remains in the too hot state (e.g., for 4 minutes) without going to a sleep mode, PMU triggers a forced shutdown. Without changing the temperature range, the system may transit between a lid closed state (e.g., 1821-1827) and a corresponding lid open state (e.g., 1811-1817) when the lid is opened or closed. When the system cools down, working states of the components (e.g., CPU, GPU, DVD) can be adjusted for higher performance. In FIG. 18, different thresholds are used for defining the transition between two states due to the change in temperature. For example, when $T > T^a_{lid\text{-}open}$, the system moves from state 1817 (normal) to state 1815 (warm); and, the system moves back to state 1817 (normal) from state 1815 (warm) only when $T < T^a_{lid\text{-}open} - T_{hysteris}$. The difference in the threshold, $T_{hysteris}$, allows the system to be at one state when the temperature fluctuates only slightly near one threshold, avoiding unnecessary actions in adjusting working states.

Although one embodiment of the present invention uses the state diagram illustrated in FIG. 18 and operations for cooling adjustment for various states described above with FIG. 18, it is understood that various different states of a state diagram can be defined and used for the operation of a computer system. Further, different transition paths and different adjustments of working states to more or less components (e.g., fan, memory chips, microprocessors, graphics chips, hard drives, optical drives, bridge chips, and others) for cooling and performances can be defined for different state diagrams for operating a data processing system. For example, in one implementation, when T exceeds $T_0$, cooling fan is activated (e.g., 33% duty cycle for ADMI03x); when $T \leq T_1$. CPU can run at full speed; when T exceeds $T_2$, cooling fan runs at full speed; when T exceeds $T_3$, CPU is forced into reduced speed mode; when T exceeds $T_4$, the system is forced to sleep, or to shutdown if not responding to the request to sleep.

In FIG. 16, after operation 1601 collects sensed information (e.g., CPU load and processor temperatures) from a plurality of sensors of a data processing system, operation 1603 determines an amount of cooling change based on the sensed information. For example, fuzzy logic principles and inference rules can be used to determine the amount of cooling changes based on the sensed information. Operation 1605 determines a prioritized list of controls to balance different goals (e.g., performance, power consumption, thermal constraint, acoustic noise, user preference, system constraint). For example, an expert system can be used to prioritize the list according to a number of system rules and user preferences. Operation 1607 selectively adjusts a subset of the prioritized list of controls to effect the amount of cooling change. The amount of cooling change can be parceled out to one or more controls according to the priorities of the controls.

Figure 17:
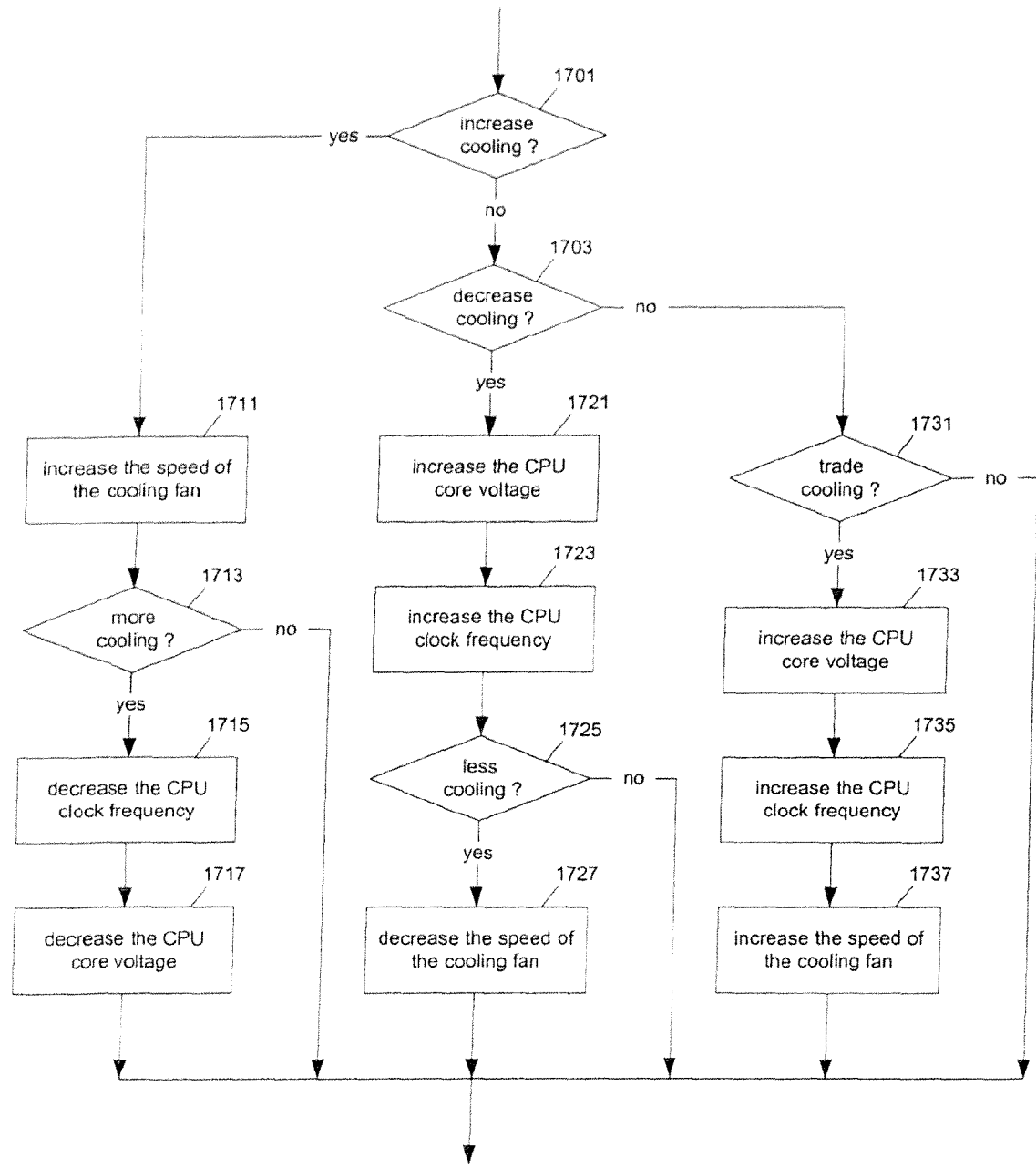
FIG. 17 illustrates a method to parcel out cooling changes to a number of controls according to one embodiment of the present invention.

FIG. 17 illustrates a method to parcel out cooling changes to a number of controls according to one embodiment of the present invention.

If operation 1701 determines to increase cooling, operation 1711 first increases the speed of the cooling fan (e.g., up to the maximum fan speed when necessary). If operation 1713 determines that more cooling is required, operation 1715 decreases the CPU clock frequency within the allowable frequency range; and, operation 1717 decreases the CPU core voltage within the allowable frequency range. This adjustment to the CPU reduces the heat generation at the expense of computation performance. Thus, the thermal constraint can be maintained while running the system at high computation performance.

If operation 1703 determines to decrease cooling, operation 1721 increases the CPU core voltage within the allowable voltage range; and, operation 1723 increases the CPU clock frequency within the allowable frequency range. This adjustment to the CPU increases the computation performance of the CPU and heat generation, which corresponds to decrease cooling. If the CPU is at the maximum performance state and operation 1725 determines less cooling is allowable, operation 1727 decreases the speed of the cooling fan to reduce noise and power consumption.

If operation 1731 determines that the CPU and the fan can trade cooling, operation 1733 increases the CPU core voltage; operation 1735 increases the CPU clock frequency; and, operation 1737 increases the speed of the cooling fan. Thus, the CPU is allowed to run at high performance, generating more heat, which is removed by increased cooling from the fan.

Thus, in FIG. 17, cooling efforts are parceled out between the CPU and the cooling fan to have a high performance within a thermal constraint. In general, the cooling efforts can be parceled out (e.g., by a Control Decider) among a list of controls according to priorities (e.g., as determined by a Priority Decider), which reflect the balancing of different goals, such as performance, power consumption, thermal constraint, acoustic noise, user preference, system constraint).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
   a housing;
   a plurality of components mounted within the housing, the plurality of components including:
      a memory;
      a processor coupled to the memory; and
      a power management unit coupled to the processor; and
   a plurality of sensors instrumented within the housing, at least one of the sensors determining a temperature in the data processing system, according to instructions stored in the memory the processor managing working states of at least a portion of the plurality of components based on information obtained from at least a portion of the plurality of sensors, the power management unit causing the system to shutdown when a measurement of one of the plurality of sensors exceeds a threshold, wherein information about the shutdown is recorded in the memory, and wherein the processor records the information about the shutdown and instructs the system to shutdown in response to a signal from the power management unit.

2. A data processing system as in claim 1, wherein the power management unit sends a signal to the processor when the measurement exceeds the threshold.

3. A data processing system as in claim 2, wherein the processor instructs the system to shutdown in response to the signal from the power management unit.

4. A data processing system as in claim 2, wherein the power management unit determines whether or nor the processor is responsive to the signal.

5. A data processing system as in claim 4, wherein the power management unit shuts off power to at least a portion of the system when the power management unit determines that the processor is not responsive.

6. A data processing system as in claim 5, wherein the power management unit comprises a watchdog timer; and wherein the power management unit determines that the processor is not responsive, if the processor does not respond to the signal before the watchdog timer expires.

7. A data processing system as in claim 1, wherein the power management unit records the information about the shutdown.

8. A method performed by a data processing system, the method comprising:
   automatically managing, according to instructions stored in a memory of the data processing system, working states of a plurality of components of the data processing system based on information obtained from at least a portion of a plurality of sensors instrumented within a housing of the data processing system, at least one of the sensors determining a temperature in the data processing system; and
   initiating a shutdown from a power management unit of the data processing system in response to a measurement of one of the plurality of sensors exceeding a threshold, wherein information about the shutdown is recorded in the memory, and wherein a processor of the data processing system records the information about the shutdown and instructs the system to shutdown in response to a signal from the power management unit.

9. A method as in claim 8, wherein the power management unit sends a signal to a processor of the data processing system when the measurement exceeds the threshold.

10. A method as in claim 9, wherein the processor instructs the system to shutdown in response to the signal from the power management unit.

11. A method as in claim 9, wherein the power management unit determines whether or nor the processor is responsive to the signal.

12. A method as in claim 11, wherein the power management unit shuts off power to at least a portion of the system when the power management unit determines that the processor is not responsive.

13. A method as in claim 12, wherein the power management unit comprises a watchdog timer; and wherein the power management unit determines that the processor is not responsive, if the processor does not respond to the signal before the watchdog timer expires.

14. A method as in claim 8, wherein the power management unit records the information about the shutdown.

15. A non-transitory machine readable medium containing executable computer program instructions which when executed by a data processing system cause said system to perform a method comprising:
- automatically managing working states of a plurality of components of the data processing system based on information obtained from at least a portion of a plurality of sensors instrumented within a housing of the data processing system, at least one of the sensors determining a temperature in the data processing system;
- wherein a power management unit of the data processing system initiates a shutdown in response to a measurement of one of the plurality of sensors exceeding a threshold, wherein information about the shutdown is recorded in a memory of the data processing system, wherein a processor of the data processing system records the information about the shutdown and instructs the system to shutdown in response to a signal from the power management unit.

16. A medium as in claim 15, wherein the power management unit sends a signal to a processor of the data processing system when the measurement exceeds the threshold.

17. A medium as in claim 16, wherein the processor instructs the system to shutdown in response to the signal from the power management unit.

18. A medium as in claim 16, wherein the power management unit determines whether or nor the processor is responsive to the signal.

19. A medium as in claim 18, wherein the power management unit shuts off power to at least a portion of the system when the power management unit determines that the processor is not responsive.

20. A medium as in claim 19, wherein the power management unit comprises a watchdog timer; and wherein the power management unit determines that the processor is not responsive, if the processor does not respond to the signal before the watchdog timer expires.

21. A medium as in claim 15, wherein the power management unit records the information about the shutdown.

22. A data processing system, comprising:
- means for automatically managing working states of a plurality of components of the data processing system based on information obtained from at least a portion of a plurality of sensors instrumented within a housing of the data processing system, at least one of the sensors determining a temperature in the data processing system; and
- means for initiating a shutdown from a power management unit of the data processing system in response to a measurement of one of the plurality of sensors exceeding a threshold, wherein information about the shutdown is recorded in the memory of the data processing system, and wherein a processor of the data processing system records the information about the shutdown and instructs the system to shutdown in response to a signal from the power management unit.

23. A data processing system as in claim 22, wherein the power management unit sends a signal to a processor of the data processing system when the measurement exceeds the threshold.

24. A data processing system as in claim 23, wherein the processor instructs the system to shutdown in response to the signal from the power management unit.

25. A data processing system as in claim 23, wherein the power management unit determines whether or nor the processor is responsive to the signal.

26. A data processing system as in claim 25, wherein the power management unit shuts off power to at least a portion of the system when the power management unit determines that the processor is not responsive.

27. A data processing system as in claim 26, wherein the power management unit comprises a watchdog timer; and wherein the power management unit determines that the processor is not responsive, if the processor does not respond to the signal before the watchdog timer expires.

28. A data processing system as in claim 22, wherein the power management unit records the information about the shutdown.

29. A method to operate a data processing system enclosed in a housing, the data processing system comprising a processor, a power management unit, and a memory, the method comprising:
- receiving measurements from a plurality of temperature sensors instrumented in the data processing system;
- adjusting working states of components of the data processing system to limit the measurements to allowable levels; and
- in response to one of the measurements exceeding an allowable level:
  - storing by the processor data indicating a cause of turning off the data processing system in the memory; and
  - automatically turning off the data processing system by the power management unit to prevent damage to the data processing system.

30. The method of claim 29, further comprising:
determining whether or not a heatsink of the data processing system is misapplied.

31. The method of claim 30, further comprising when the heatsink is misapplied, shutting off the system.

32. The method of claim 30, wherein the data indicates that a software process for adjusting working states of the components failed.

33. The method of claim 29, further comprising:
informing a user of trading performance for reduced heat when one or more components are adjusted to a low performance working state.

34. The method of claim 33, wherein the low performance working state comprises running a processor at a reduced frequency and a reduced core voltage.

35. A data processing system enclosed in a housing, the data processing system comprising:
- memory to store instructions;
- a processor coupled to the memory;
- a plurality of temperature sensors instrumented in the data processing system and coupled to the processor, the processor to receive measurements from the plurality of temperature sensors, according to the instructions the processor to adjust working states of components of the data processing system to limit the measurements to allowable levels;
- a power management unit coupled to the processor, in response to one of the measurements exceeding an allowable level:
  - the power management unit and the processor to store data indicating a cause of turning off the data processing system in the memory;
  - the power management unit to automatically turn off the data processing system to prevent damage to the data processing system.

36. The system of claim 35, wherein the processor is configured according to the instructions to determine whether or not a heatsink of the data processing system is misapplied.

37. The system of claim 36, further comprising when the heatsink is misapplied, shutting off the system.

38. The system of claim 36, wherein the data indicates that a software process for adjusting working states of the components failed.

39. The system of claim 35, wherein the processor is configured according to the instructions to inform a user of trading performance for reduced heat when one or more components are adjusted to a low performance working state.

40. The system of claim 39, wherein the low performance working state comprises running a processor at a reduced frequency and a reduced core voltage.

41. A non-transitory machine readable medium containing executable computer program instructions which when executed by a data processing system cause said system to perform a method to operate the data processing system comprising a processor, a power management unit, and a memory and enclosed in a housing, the method comprising:
receiving measurements from a plurality of temperature sensors instrumented in the data processing system;
adjusting working states of components of the data processing system to limit the measurements to allowable levels; and
in response to one of the measurements exceeding an allowable level:
storing by the processor data indicating a cause of turning off the data processing system in the memory; and
automatically turning off the data processing system by the power management unit to prevent damage to the data processing system.

42. The medium of claim 41, wherein the method further comprises:
determining whether or not a heatsink of the data processing system is misapplied.

43. The medium of claim 42, wherein the method further comprises when the heatsink is misapplied, shutting off the system.

44. The medium of claim 42, wherein the data indicates that a software process for adjusting working states of the components failed.

45. The medium of claim 41, wherein the method further comprises:
informing a user of trading performance for reduced heat when one or more components are adjusted to a low performance working state.

46. The medium of claim 45, wherein the low performance working state comprises running a processor at a reduced frequency and a reduced core voltage.

47. A data processing system enclosed in a housing, the data processing system comprising:
a memory;
means for receiving measurements from a plurality of temperature sensors instrumented in the data processing system;
means for adjusting working states of components of the data processing system to limit the measurements to allowable levels; and
in response to one of the measurements exceeding an allowable level:
means for storing data indicating a cause of turning off the data processing system in the memory, wherein the means for storing comprises a processor; and
means for automatically turning off the data processing system to prevent damage to the data processing system, wherein the means for automatically turning off the data processing system comprises a power management unit.

48. The system of claim 47, wherein said means for adjusting further comprises:
means for slowly adjusting a clock source and a voltage source to cause the IC chip running at a current clock frequency and a current core voltage to run at a desired clock frequency and a desired core voltage.

49. The system of claim 47, further comprising:
means for determining whether or not a heatsink of the data processing system is misapplied.

50. The system of claim 49, further comprising when the heatsink is misapplied, means for shutting off the system.

51. The system of claim 49, wherein the data indicates that a software process for adjusting working states of the components failed.

52. The system of claim 47, further comprising:
means for informing a user of trading performance for reduced heat when one or more components are adjusted to a low performance working state.

53. The system of claim 52, wherein the low performance working state comprises running a processor at a reduced frequency and a reduced core voltage.

* * * * *

UNITED STATES PATENT AND TRADEMARK OFFICE
CERTIFICATE OF CORRECTION

| | | |
|---|---|---|
| PATENT NO. | : 8,448,000 B2 | Page 1 of 1 |
| APPLICATION NO. | : 13/550922 | |
| DATED | : May 21, 2013 | |
| INVENTOR(S) | : Michael Culbert et al. | |

It is certified that error appears in the above-identified patent and that said Letters Patent is hereby corrected as shown below:

Claims
Column 3, line 24 (claim 22): "the processor is not responsive the power management" should read --the processor is not responsive, the power management--.

Signed and Sealed this
Eighth Day of December, 2015

Michelle K. Lee
*Director of the United States Patent and Trademark Office*

(12) EX PARTE REEXAMINATION CERTIFICATE (10651st)
United States Patent
Culbert et al.

(10) Number: US 8,448,000 C1
(45) Certificate Issued: Jul. 7, 2015

(54) METHODS AND APPARATUSES FOR OPERATING A DATA PROCESSING SYSTEM

(75) Inventors: Michael Culbert, Monte Sereno, CA (US); Keith Alan Cox, Campbell, CA (US); Brian Howard, Portola Valley, CA (US); Josh de Cesare, Campbell, CA (US); Richard Charles Williams, Saratoga, CA (US); Dave Robbins Falkenburg, San Jose, CA (US); Daisie Iris Huang, Oakland, CA (US); Dave Radcliffe, Sunnyvale, CA (US)

(73) Assignee: APPLE INC., Cupertino, CA (US)

Reexamination Request:
No. 90/013,162, Feb. 24, 2014

Reexamination Certificate for:
Patent No.: 8,448,000
Issued: May 21, 2013
Appl. No.: 13/550,922
Filed: Jul. 17, 2012

Related U.S. Application Data

(62) Division of application No. 12/267,329, filed on Nov. 7, 2008, now Pat. No. 8,237,386, which is a division of application No. 10/917,719, filed on Aug. 12, 2004, now Pat. No. 7,451,332.

(60) Provisional application No. 60/495,447, filed on Aug. 15, 2003.

(51) Int. Cl.
*G06F 1/26* (2006.01)
*G06F 1/32* (2006.01)
*G06F 1/20* (2006.01)
*G05D 23/24* (2006.01)

(52) U.S. Cl.
CPC .............. *G06F 1/26* (2013.01); *G05D 23/2442* (2013.01); *G06F 1/20* (2013.01); *G06F 1/3203* (2013.01); *G06F 1/324* (2013.01); *G06F 1/3296* (2013.01); *Y02B 60/1217* (2013.01); *Y02B 60/1285* (2013.01); *Y10S 706/90* (2013.01)

(58) Field of Classification Search
None
See application file for complete search history.

(56) References Cited

To view the complete listing of prior art documents cited during the proceeding for Reexamination Control Number 90/013,162, please refer to the USPTO's public Patent Application Information Retrieval (PAIR) system under the Display References tab.

*Primary Examiner* — Michael J. Yigdall

(57) ABSTRACT

Methods and apparatuses to manage working of a data processing system. At least one embodiment of the present invention includes a data processing system with one or more sensors (e.g., physical sensors such as tachometer and thermistors, and logical sensors such as CPU load) for line grain control of one or inure components (e.g., processor, fan, hard drive, optical drive) of the system the working conditions that balance various goals (e.g., user preferences, performance, power consumption, thermal constraints, acoustic noise). In one example, the clock frequency and core voltage for a processor are actively managed to balance performance and power consumption (heal generation) without a significant latency. In one example, the speed of a cooling tan is actively managed to balance cooling effort and noise (and/or power consumption).

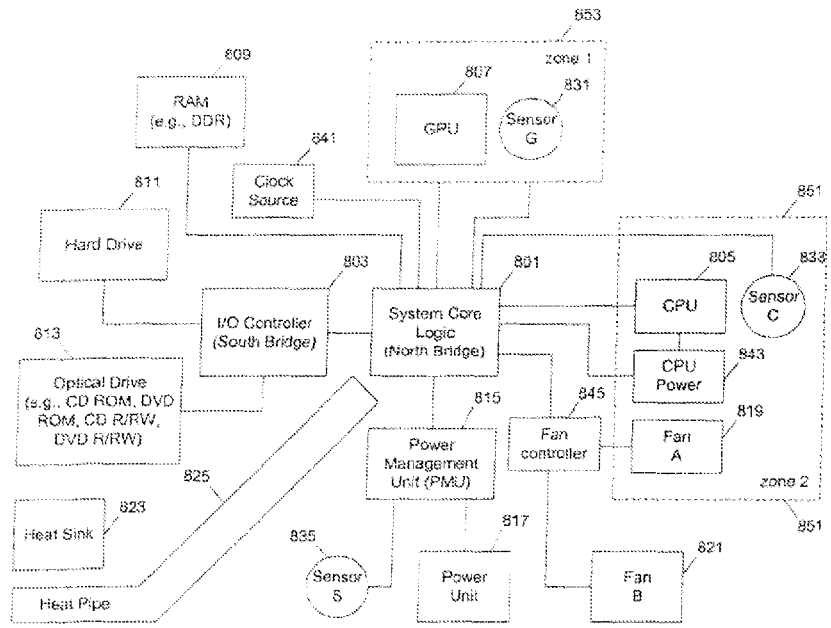

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3-5, 7, 10-12, 14, 17-19, 21, 24-26 and 28 are cancelled.

Claims 1, 2, 6, 8, 9, 13, 15, 16, 20, 22, 23, 27, 29, 35, 41 and 47 are determined to be patentable as amended.

Claims 33, 34, 39, 40, 45, 46, 48, 52 and 53, dependent on an amended claim, are determined to be patentable.

Claims 30-32, 36-38, 42-44 and 49-51 were not reexamined.

1. A data processing system, comprising:
a housing;
a plurality of components mounted within the housing, the plurality of components including:
a memory;
a processor coupled to the memory; and
a power management unit coupled to the processor; and
a plurality of sensors instrumented within the housing, at least one of the sensors determining a temperature in the data processing system, according to instructions stored in the memory the processor managing working states of at least a portion of the plurality of components based on information obtained from at least a portion of the plurality of sensors, the power management unit causing the system to shutdown when a measurement of one of the plurality of sensors exceeds a threshold,
*wherein the power management unit determines whether or not the processor is responsive to a signal,*
wherein *when the processor is responsive,* information about the shutdown is recorded in the memory[, and wherein] *by* the processor[records the information about the shutdown] *and the processor* instructs the system to shutdown in response to[a] *the* signal from the power management unit, *and*
*wherein when the power management unit determines that the processor is not responsive, the power management unit records the information about the shutdown and the power management unit shuts off power to at least a portion of the system.*

2. A data processing system as in claim 1, wherein the power management unit sends[a] *the* signal to the processor when the measurement exceeds the threshold.

6. A data processing system as in claim[5] *1*, wherein the power management unit comprises a watchdog timer; and wherein the power management unit determines that the processor is not responsive[,] if the processor does not respond to the signal before the watchdog timer expires.

8. A method performed by a data processing system, the method comprising:
automatically managing, according to instructions stored in a memory of the data processing system, working states of a plurality of components of the data processing system based on information obtained from at least a portion of a plurality of sensors instrumented within a housing of the data processing system, at least one of the sensors determining a temperature in the data processing system; and
initiating a shutdown from a power management unit of the data processing system in response to a measurement of one of the plurality of sensors exceeding a threshold,
*wherein the power management unit determines whether or not a processor is responsive to a signal,*
wherein *when the processor is responsive,* information about the shutdown is recorded in the memory[, and wherein a] *by the* processor[of the data processing system records the information about the shutdown] *and the processor* instructs the system to shutdown in response to[a] *the* signal from the power management unit, *and*
*wherein when the power unit determines that the processor is not responsive, the power management unit records the information about the shutdown and the power management unit shuts off power to at least a portion of the system.*

9. A method as in claim 8, wherein the power management unit sends[a] *the* signal to[a] *the* processor of the data processing system when the measurement exceeds the threshold.

13. A method as in claim[12] *8*, wherein the power management unit comprises a watchdog timer; and wherein the power management unit determines that the processor is not responsive[,] if the processor does not respond to the signal before the watchdog timer expires.

15. A non-transitory machine readable medium containing executable computer program instructions which when executed by a data processing system cause said system to perform a method comprising:
automatically managing, *according to instructions stored in a memory of the data processing system,* working states of a plurality of components of the data processing system based on information obtained from at least a portion of a plurality of sensors instrumented within a housing of the data processing system, at least one of the sensors determining a temperature in the data processing system;
wherein a power management unit of the data processing system initiates a shutdown in response to a measurement of one of the plurality of sensors exceeding a threshold,
*wherein the power management unit determines whether or not a processor is responsive to a signal,*
wherein *when the processor is responsive,* information about the shutdown is recorded in[a] *the* memory[of the data processing system, wherein a] *by the* processor[of the data processing system records the information about the shutdown] *and the processor* instructs the system to shutdown in response to[a] *the* signal from the power management unit, *and*
*wherein when the power management unit determines that the processor is not responsive, the power management unit records the information about the shutdown and the power management unit shuts off power to at least a portion of the system.*

16. A medium as in claim 15, wherein the power management unit sends[a] *the* signal to [a] *the* processor of the data processing system when the measurement exceeds the threshold.

20. A medium as in claim[19] *15*, wherein the power management unit comprises a watchdog timer; and wherein the power management unit determines that the processor is not responsive[,] if the processor does not respond to the signal before the watchdog timer expires.

22. A data processing system, comprising:
means for automatically managing, *according to instructions stored in a memory of the data processing system,* working states of a plurality of components of the data processing system based on information obtained from at least a portion of a plurality of sensors instrumented within a housing of the data processing system, at least one of the sensors determining a temperature in the data processing system; and
means for initiating a shutdown from a power management unit of the data processing system in response to a measurement of one of the plurality of sensors exceeding a threshold,
wherein the power management unit determines whether or not a processor is responsive to a signal,
wherein *when the processor is responsive,* information about the shutdown is recorded in the memory[of the data processing system, and wherein a] *by the* processor[of the data processing system records the information about the shutdown] and *the processor* instructs the system to shutdown in response to[a] *the* signal from the power management unit, *and*
*wherein when the power management unit determines that the processor is not responsive the power management unit records the information about the shutdown and the power management unit shuts off power to at least a portion of the system.*

23. A data processing system as in claim 22, wherein the power management unit sends[a] *the* signal to[a] *the* processor of the data processing system when the measurement exceeds the threshold.

27. A data processing system as in claim[26] *22,* wherein the power management unit comprises a watchdog timer; and wherein the power management unit determines that the processor is not responsive[,] if the processor does not respond to the signal before the watchdog timer expires.

29. A method to operate a data processing system enclosed in a housing, the data processing system comprising a processor, a power management unit, and a memory *to store instructions,* the method comprising:
receiving measurements from a plurality of temperature sensors instrumented in the data processing system;
adjusting working states of components of the data processing system to limit the measurements to allowable levels; and
in response to one of the measurements exceeding an allowable level:
*the power management unit determining whether or not the processor is responsive to a signal,*
*wherein when the processor is responsive,* storing by the processor data indicating a cause of turning off the data processing system in the memory[;] *and the processor instructing the system to shutdown in response to the signal from the power management unit,* and
*wherein when the power management unit determines that the processor is not responsive, the power management unit records the data indicating the cause of turning off the data processing system and the power management unit* automatically turning off the data processing system[by the power management unit] to prevent damage to the data processing system.

35. A data processing system enclosed in a housing, the data processing system comprising:
memory to store instructions;
a processor coupled to the memory;
a plurality of temperature sensors instrumented in the data processing system and coupled to the processor, the processor to receive measurements from the plurality of temperature sensors, according to the instructions the processor to adjust working states of components of the data processing system to limit the measurements to allowable levels;
a power management unit coupled to the processor, in response to one of the measurements exceeding an allowable level:
*the power management unit to determine whether or not the processor is responsive to a signal,*
*wherein when the processor is responsive,* the power management unit and the processor to store data indicating a cause of turning off the data processing system in the memory[;] *and the processor instructing the system to shutdown in response to the signal from the power management unit,* and
*wherein when the power management unit determines that the processor is not responsive, the power management unit records the data indicating the cause of turning off the data processing system and* the power management unit to automatically turn off the data processing system to prevent damage to the data processing system.

41. A non-transitory machine readable medium containing executable computer program instructions which when executed by a data processing system. cause said system to perform a method to operate the data processing system comprising a processor, a power management unit, and a memory *to store instructions* and enclosed in a housing, the method comprising:
receiving measurements from a plurality of temperature sensors instrumented in the data processing system;
adjusting working states of components of the data processing system to limit the measurements to allowable levels; and
in response to one of the measurements exceeding an allowable level:
*the power management unit determining whether or not the processor is responsive to a signal,*
*wherein when the processor is responsive,* storing by the processor data indicating a cause of turning off the data processing system in the memory[;] *and the processor instructing the system to shutdown in response to the signal from the power management unit,* and
*wherein when the power management unit determines that the processor is not responsive, the power management unit records the data indicating the cause of turning off the data processing system and the power management unit* automatically turning off the data processing system[by the power management unit] to prevent damage to the data processing system.

47. A data processing system enclosed in a housing, the data processing system comprising:
a memory *to store instructions;*
*a processor;*
means for receiving measurements from a plurality of temperature sensors instrumented in the data processing system;
means for adjusting working states of components of the data processing system to limit the measurements to allowable levels; and
in response to one of the measurements exceeding an allowable level:
*means for determining whether a processor is responsive to a signal, wherein the means for determining comprises a power management unit;*
means for storing data indicating a cause of turning off the data processing system in the memory *and instructing*

*the system to shutdown in response to the signal from the power management unit*, wherein the means for storing *and instructing* comprises[a] *the* processor *when the processor is responsive*; and means for *storing the data indicating the cause of turning off the data processing system and* automatically turning off the data processing system to prevent damage to the data processing system *when the processor is not responsive*, wherein the means for *storing and* automatically turning off the data processing system comprises[a] *the* power management unit.

\* \* \* \* \*